(12) United States Patent
Ambroziak et al.

(10) Patent No.: US 11,575,275 B1
(45) Date of Patent: Feb. 7, 2023

(54) SYSTEMS AND METHODS FOR ELECTRIC VEHICLE CHARGING AND POWER MANAGEMENT

(71) Applicant: Charge Fusion Technologies, LLC, Ridgefield, CT (US)

(72) Inventors: Jeffrey R. Ambroziak, Guilford, CT (US); Carson C. K. Fincham, Ridgefield, CT (US)

(73) Assignee: Charge Fusion Technologies, LLC, Ridgefield, CT (US)

( * ) Notice: Subject to any disclaimer, the term of this patent is extended or adjusted under 35 U.S.C. 154(b) by 0 days.

(21) Appl. No.: 17/829,408

(22) Filed: Jun. 1, 2022

Related U.S. Application Data

(63) Continuation of application No. 17/306,776, filed on May 3, 2021, which is a continuation of application
(Continued)

(51) Int. Cl.
*H02J 7/14* (2006.01)
*B60L 3/12* (2006.01)
(Continued)

(52) U.S. Cl.
CPC .............. *H02J 7/1446* (2013.01); *B60L 3/12* (2013.01); *B60L 8/003* (2013.01); *B60L 53/126* (2019.02); *B60L 53/14* (2019.02); *B60L 53/305* (2019.02); *B60L 53/64* (2019.02); *B60L 53/65* (2019.02); *B60L 53/665* (2019.02); *B60L 55/00* (2019.02); *G06Q 30/0283* (2013.01); *G06Q 30/04* (2013.01); *G06Q 50/06* (2013.01); *B60L 2200/26* (2013.01); *B60L 2210/40* (2013.01); *B60L 2240/72* (2013.01); *B60L 2240/80* (2013.01); *B60L 2250/10* (2013.01); *B60L 2250/16* (2013.01); *B60L 2260/52* (2013.01); *B60L 2260/54* (2013.01);
(Continued)

(58) Field of Classification Search
CPC ...... H02J 7/1446; B60L 55/00; B60L 53/126; B60L 53/64; B60L 53/14; B60L 53/305; B60L 53/665; B60L 53/65; B60L 3/12; B60L 8/003; G06Q 30/0283; G06Q 30/04; G06Q 50/06
USPC ...................................................... 705/7.36
See application file for complete search history.

(56) References Cited

U.S. PATENT DOCUMENTS 4,347,472 A   8/1982   Lemelson
4,617,506 A   10/1986  Bogie
(Continued)

FOREIGN PATENT DOCUMENTS

JP   H1055496 A   2/1998
JP   10170293 A   6/1998
(Continued)

OTHER PUBLICATIONS

Notice of Allowance dated Sep. 28, 2022 for U.S. Appl. No. 17/829,412 (pp. 1-17).
(Continued)

*Primary Examiner* — Igor N Borissov
(74) *Attorney, Agent, or Firm* — RowanTree Law Group PLLC; Carson C. K. Fincham

(57) ABSTRACT

Systems and methods for charging electric vehicles and for quantitative and qualitative load balancing of electrical demand are provided.

29 Claims, 10 Drawing Sheets

Related U.S. Application Data

No. 17/012,325, filed on Sep. 4, 2020, now Pat. No. 10,998,753, which is a continuation of application No. 15/848,017, filed on Dec. 20, 2017, now Pat. No. 10,819,135, which is a continuation of application No. 12/502,041, filed on Jul. 13, 2009, now Pat. No. 9,853,488.

(60) Provisional application No. 61/134,646, filed on Jul. 11, 2008.

(51) Int. Cl.
```
B60L 8/00      (2006.01)
G06Q 30/02     (2012.01)
G06Q 30/04     (2012.01)
G06Q 50/06     (2012.01)
B60L 53/64     (2019.01)
B60L 53/14     (2019.01)
B60L 53/65     (2019.01)
B60L 53/66     (2019.01)
B60L 55/00     (2019.01)
B60L 53/30     (2019.01)
B60L 53/126    (2019.01)
```

(52) U.S. Cl.
CPC ....... B60L 2260/58 (2013.01); B60L 2270/32 (2013.01); Y02E 60/00 (2013.01); Y02T 10/70 (2013.01); Y02T 10/7072 (2013.01); Y02T 10/72 (2013.01); Y02T 10/92 (2013.01); Y02T 90/12 (2013.01); Y02T 90/14 (2013.01); Y02T 90/16 (2013.01); Y02T 90/167 (2013.01); Y04S 10/126 (2013.01); Y04S 30/14 (2013.01); Y04S 50/12 (2013.01); Y04S 50/14 (2013.01)

(56) References Cited

U.S. PATENT DOCUMENTS

| | | | |
|---|---|---|---|
| 4,800,328 A | | 1/1989 | Bolger |
| 5,487,002 A | | 1/1996 | Diller |
| 5,623,194 A | | 4/1997 | Boll |
| 5,669,470 A | * | 9/1997 | Ross .............. B60L 53/126 320/109 |
| 5,686,812 A | * | 11/1997 | Hotta .............. B60L 53/14 320/152 |
| 5,710,502 A | | 1/1998 | Poumey |
| 5,727,708 A | | 3/1998 | Erickson |
| 5,790,976 A | | 8/1998 | Boll |
| 5,892,346 A | | 4/1999 | Moroto |
| 3,421,600 A1 | | 7/2002 | Ross |
| 6,586,940 B2 | | 7/2003 | Asakura |
| 6,618,650 B1 | | 9/2003 | Nakai |
| 7,055,340 B2 | | 6/2006 | Umebayashi |
| 7,358,701 B2 | * | 4/2008 | Field .............. G01R 31/374 320/155 |
| 7,402,978 B2 | | 7/2008 | Pryor |
| 7,443,049 B1 | | 10/2008 | Jones |
| 7,671,567 B2 | | 3/2010 | Eberhard |
| 7,683,570 B2 | | 3/2010 | Krauer |
| 7,698,078 B2 | | 4/2010 | Kelty |
| 7,741,816 B2 | | 6/2010 | Kelty |
| 7,761,203 B2 | * | 7/2010 | Yamada .............. B60L 3/12 903/903 |
| 7,778,746 B2 | | 8/2010 | McLeod |
| 7,782,021 B2 | | 8/2010 | Kelty |
| 7,827,120 B1 | | 11/2010 | Evans |
| 7,849,944 B2 | | 12/2010 | Devault |
| 7,880,337 B2 | | 2/2011 | Farkas |
| 7,949,435 B2 | | 5/2011 | Pollack |
| 7,956,570 B2 | | 6/2011 | Lowenthal |
| 8,198,856 B2 | | 6/2012 | Koide |
| 8,531,162 B2 | | 9/2013 | Hafner |
| 2003/0152088 A1 | | 8/2003 | Kominami |
| 2004/0010358 A1 | | 1/2004 | Oesterling |
| 2008/0039989 A1 | * | 2/2008 | Pollack ............ B60L 55/00 701/22 |
| 2008/0040223 A1 | | 2/2008 | Bridges |
| 2008/0162305 A1 | | 7/2008 | Rousso |
| 2008/0243331 A1 | | 10/2008 | Kato |
| 2008/0275848 A1 | | 11/2008 | Allen |
| 2008/0312782 A1 | | 12/2008 | Berdichevsky |
| 2009/0001927 A1 | | 1/2009 | Stamos |
| 2009/0021385 A1 | | 1/2009 | Kelty |
| 2009/0030712 A1 | | 1/2009 | Bogolea |
| 2009/0089254 A1 | | 4/2009 | Von Kaenel |
| 2009/0130965 A1 | | 5/2009 | Galvez-Ramos |
| 2009/0139781 A1 | * | 6/2009 | Straubel .............. B60L 53/14 701/22 |
| 2009/0144622 A1 | | 6/2009 | Evans |
| 2009/0189807 A1 | * | 7/2009 | Scalisi .............. G01S 19/49 342/357.57 |
| 2009/0313034 A1 | | 12/2009 | Ferro |
| 2009/0313174 A1 | * | 12/2009 | Hafner .............. B60L 53/62 705/80 |
| 2011/0089887 A1 | | 4/2011 | Ward |
| 2011/0148356 A1 | | 6/2011 | Lowenthal |

FOREIGN PATENT DOCUMENTS

| | | | |
|---|---|---|---|
| JP | 2003294463 | A | 10/2003 |
| JP | 2006112932 | A | 4/2006 |
| JP | 2006298262 | A | 11/2006 |
| WO | 2004109889 | | 12/2004 |
| WO | 2008059846 | A1 | 5/2008 |

OTHER PUBLICATIONS

Office Action (Non-Final Rejection) dated Sep. 21, 2022 for U.S. Appl. No. 17/826,229 (pp. 1-17).
Office Action (Non-Final Rejection) dated Sep. 26, 2022 for U.S. Appl. No. 17/306,776 (pp. 1-20).
Office Action dated Sep. 21, 2022 for U.S. Appl. No. 17/826,229 (pp. 1-18).
Inter Partes Review Preliminary Patent Owner's Response, Inter Partes Review of U.S. Pat. No. 10,998,753 for U.S. Appl. No. 17/012,325 dated Nov. 4, 2022; IPR 2022-01217; 121 pps.
Inter Partes Review Petition of U.S. Pat. No. 9,853,488 for U.S. Appl. No. 12/502,041 dated Oct. 21, 2022; IPR2023-00062; 333 pps.
Inter Partes Review Petition of U.S. Pat. No. 10,819,135 for U.S. Appl. No. 15/848,017 dated Oct. 21, 2022; IPR2023-00063; 232 pps.
Inter Partes Review Notice of filing date accorded, Inter Partes Review of U.S. Pat. No. 10,819,135 for U.S. Appl. No. 15/848,017 dated Nov. 17, 2022; IPR2023-00063; 5 pps.
Inter Partes Review Notice of filing date accorded, Inter Partes Review of U.S. Pat. No. 9,853,488 for U.S. Appl. No. 12/502,041 dated Nov. 17, 2022; IPR2023-00062; 5 pps.
Wikipedia (R) download for article title "Better Place", http://en.wikipedia.org/wiki/Better_Place, dated Dec. 12, 2013; 14 pps.
Office Action for U.S. Appl. No. 12/502,041 dated Jan. 7, 2013; 17 pps.
Notice of Allowance for U.S. Appl. No. 12/502,041 dated Oct. 30, 2017; 7 pps.
Website: The Tesla Roadster (first generation) Drive Zero Car Guide—Drive Zero "https://www.drivezero.com.au/cars/tesla/tesla-car-guides/tesla-roadster-1-guide/" download date Oct. 21, 2019; 21 pps.
Office Action for U.S. Appl. No. 15/848,017 dated Jan. 17, 2020; 21 pps.
Notice of Allowance or U.S. Appl. No. 15/848,017 dated Sep. 21, 2020; 16 pps.
Office Action for U.S. Appl. No. 12/502,041 dated Dec. 15, 2011; 9 pps.
Final Office Action for U.S. Appl. No. 12/502,041 dated Mar. 29, 2012; 9 pps.

(56) References Cited

OTHER PUBLICATIONS

Office Action for U.S. Appl. No. 12/502,041 dated Aug. 12, 2013; 15 pps.

Final Office Action for U.S. Appl. No. 12/502,041 dated Feb. 3, 2014; 21 pps.

First Office Action for Application No. 117/012,325 dated Dec. 2, 2020; 2 pps.

Final Office Action for Application No. 117/012,325 dated Feb. 12, 2021; 16 pps.

Notice of Allowance for Application No. 117/012,325 dated Mar. 12, 2021; 12 pps.

Office Action dated Aug. 3, 2022 for U.S. Appl. No. 17/826,229 (pp. 1-4).

Office Action dated Aug. 5, 2022 for U.S. Appl. No. 17/829,412 (pp. 1-4).

Inter Partes Review Petition of U.S. Pat. No. 9,853,488 for U.S. Appl. No. 12/502,041 dated Feb. 25, 2022; IPR PR2022-00519; 1719 pps.

Inter Partes Review Notice of filing date accorded, Inter Partes Review of U.S. Pat. No. 9,853,488 for U.S. Appl. No. 12/502,041 dated Mar. 17, 2022; IPR PR2022-00519; 5 pps.

Inter Partes Review Preliminary Patent Owner's Response of U.S. Pat. No. 9,853,488 for U.S. Appl. No. 12/502,041 dated Jun. 17, 2022; IPR PR2022-00519; 1690 pps.

Inter Partes Review Decision (Denied) of U.S. Pat. No. 9,853,488 for U.S. Appl. No. 12/502,041 dated Aug. 24, 2022; IPR PR2022-00519; 12 pps.

Litigation Report (*Charge Fusion Technologies, LLC* v. *Tesla, Inc.*, W.D.TX, 6:21-cv-01078-ADA) of U.S. Pat. No. 9,853,488 / U.S. Pat. No. 10,819,135 / U.S. Pat. No. 10,998,753 for U.S. Appl. No. 12/502,041 / U.S. Appl. No. 15/848,017 / U.S. Appl. No. 17/012,325 dated May 12, 2022; 1 pp.

Defendant Disclosure of Preliminary Proposed Claim Term Constructions (*Charge Fusion Technologies, LLC* v. *Tesla, Inc.*, W.D. TX, 6:21-cv-01078-ADA) of U.S. Pat. No. 9,853,488 / U.S. Pat. No. 10,819,135 / U.S. Pat. No. 10,998,753 for U.S. Appl. No. 12/502,041 / U.S. Appl. No. 15/848,017 / U.S. Appl. No. 17/012,325 dated Apr. 29, 2022; 9 pps.

Defendant Motion to Dismiss (*Charge Fusion Technologies, LLC* v. *Tesla, Inc.*, W.D.TX, 6:21-cv-01078-ADA) of U.S. Pat. No. 9,853,488 / U.S. Pat. No. 10,819,135 / U.S. Pat. No. 10,998,753 for U.S. Appl. No. 12/502,041 / U.S. Appl. No. 15/848,017 / U.S. Appl. No. 17/012,325 dated Jan. 7, 2022; 18 pps.

Defendant Preliminary Invaldity Contentions (*Charge Fusion Technologies, LLC* v. *Tesla, Inc.*, W.D.TX, 6:21-cv-01078-ADA) of U.S. Pat. No. 9,853,488 / U.S. Pat. No. 10,819,135 / U.S. Pat. No. 10,998,753 for U.S. Appl. No. 12/502,041 / U.S. Appl. No. 15/848,017 / U.S. Appl. No. 17/012,325 dated Apr. 1, 2022; 51 pps.

Inter Partes Review Petition of U.S. Pat. No. 10,998,753 for U.S. Appl. No. 17/012,325 dated Jul. 22, 2022; IPR 2022-01217; 594 pps.

Inter Partes Review Notice of filing date accorded, Inter Partes Review of U.S. Pat. No. 10,998,753 for U.S. Appl. No. 17/012,325 dated Aug. 4, 2022; IPR 2022-01217; 5 pps.

\* cited by examiner

SYSTEMS AND METHODS FOR ELECTRIC VEHICLE CHARGING AND POWER MANAGEMENT

CROSS-REFERENCE TO RELATED APPLICATIONS

The present Application claims benefit and priority under 35 U.S.C. § 120 to, and is a Continuation of, U.S. Pat. No. 17/306,776 filed on May 3, 2021 and titled "SYSTEMS AND METHODS FOR CHARGING ELECTRIC VEHICLES", which itself claims benefit and priority to U.S. patent application Ser. No. 17/012,325 filed on Sep. 4, 2020 and titled "SYSTEMS AND METHODS FOR CHARGING ELECTRIC VEHICLES UTILIZING A TOUCH-SENSITIVE INTERFACE", which issues as U.S. Pat. No. 10,998,753 on May 4, 2021 and which itself claims benefit and priority to U.S. patent application Ser. No. 15/848,017 filed on Dec. 20, 2017 and titled "SYSTEMS AND METHODS FOR CHARGING ELECTRIC VEHICLES UTILIZING A TOUCH-SENSITIVE INTERFACE", which issued as U.S. Pat. No. 10,819,135 on Oct. 27, 2020 and which itself claims benefit and priority to U.S. patent application Ser. No. 12/502,041 filed on Jul. 13, 2009 and titled "SYSTEMS AND METHODS FOR ELECTRIC VEHICLE CHARGING AND POWER MANAGEMENT" which issued as U.S. Pat. No. 9,853,488 on Dec. 26, 2017 and which itself claims benefit and priority under 35 U.S.C. § 119(e) to U.S. Provisional Patent Application Ser. No. 61/134,646 filed Jul. 11, 2008, entitled "SYSTEM AND METHOD OF DISTRIBUTION FOR CHARGING ELECTRIC VEHICLES", the entirety of each of which is incorporated by reference herein for all purposes.

BACKGROUND

Improvements in battery technology provide the potential of economically viable electric-powered modes of transportation including, but not limited to, automobiles, motorcycles, buses, etc. One oft cited drawback of such electrical vehicles is the need to plug them in regularly to replenish their electrical charge. First, such charging will likely require more time than is typically required to fill up an automobile with a petroleum based product. As a result, the owner of an electrical automobile must often times adhere to a schedule of charging that renders the automobile unusable for protracted stretches of time. In addition, there exists a resistance to performing the act of plugging in an automobile and subsequently unplugging the vehicle in order to maintain a charged vehicle.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
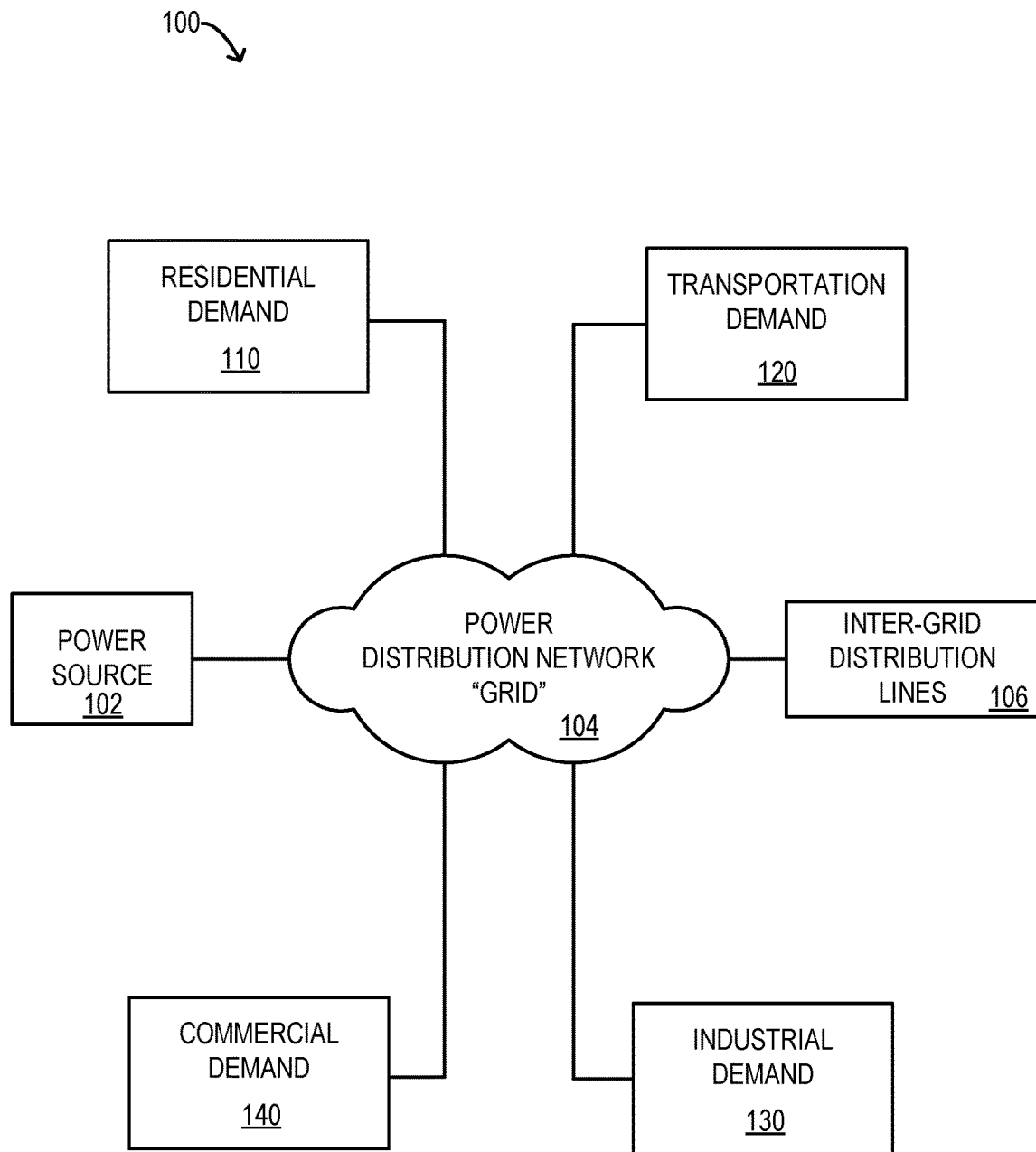
FIG. 1 is a block diagram of a system according to some embodiments.

Applicant has recognized that, in some situations, it may be advantageous to intelligently charge vehicles. In some embodiments, for example, intelligent vehicle charging may comprise receiving (e.g., from a vehicle sensor) information indicative of a presence of a vehicle in a parking space. Intelligent charging may also or alternatively comprise receiving (e.g., from a communication device) information indicative of an identifier of the vehicle, determining, based at least on the information indicative of the identifier of the vehicle, a charging schedule for the vehicle, and/or charging, in accordance with the charging schedule, the vehicle.

Applicant has also recognized that, in some situations, it may be advantageous to provide intelligent quantitative load balancing for vehicle charging. In some embodiments, for example, intelligent quantitative load balancing for vehicle charging may comprise determining an estimated amount of power required to charge a plurality of vehicles to desired levels. Intelligent quantitative load balancing for vehicle charging may also or alternatively comprise providing (e.g., via a communication device), to a Power Supplying Entity (PSE), information indicative of the required power, receiving (e.g., via the communication device), from the PSE, information indicative of a time when a best available rate will be available to purchase the required power, and/or charging, at the indicated time and via a plurality of vehicle charging devices, the plurality of vehicles.

Applicant has further recognized that, in some situations, it may be advantageous to provide intelligent qualitative load balancing for electrical loads (e.g., vehicle charging). In some embodiments, for example, intelligent qualitative load balancing for electrical loads may comprise determining an electrical load that requires electrical power, determining a plurality of available sources of electrical power, determining a characteristic of each of the plurality of available sources of power, selecting, based at least in part on the determined characteristics of the plurality of available sources of power, one or more of the available sources of power, and/or activating at least one of electrical switch to cause electrical power from the selected one or more of the available sources of power to be provided to the electrical load.

II. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

Some embodiments described herein are associated with a "Power Supplying Entity (PSE)". As used herein, the terms "power supplying entity" and "PSE" may generally be utilized interchangeably and may generally refer to any entity (e.g., person, company, and/or organization or group) that is associated with the generation and/or provision, transmission, storage, and/or conversion of electrical energy. A PSE device may comprise any type of device associated with such generation and/or provision, transmission, storage, and/or conversion of electrical energy. Examples of PSE devices may include, but are not limited to, a power generation unit (e.g., a gas, coal, oil, biomass, and/or solar boiler and/or generator), a power generation facility (e.g., a hydroelectric facility), electric transmission lines, a transformer and/or inverter, a battery, a meter, and/or a capacitor.

Some embodiments described herein are associated with an "Electric Charging System (ECS)". As used herein, the terms "electric charging system" and "ECS" may generally be utilized interchangeably and may generally refer to any combination of hardware, software, firmware, and/or microcode that is operative to conduct, manage, schedule, and/or otherwise facilitate the charging of one or more vehicles. As utilized in some embodiments, an ECS may comprise a system configured to charge a plurality of vehicles (such as electric and/or hybrid-electric vehicles) parked in a parking lot and coupled to accept (e.g., from the ECS and/or a component thereof) electrical power. In some embodiments, such vehicles may be coupled to accept electrical power from an ECS in a wired and/or wireless fashion.

As used herein, the term "electric vehicle" may generally refer to any vehicle that utilizes, stores, and/or provides electrical power (e.g., buses, trains, cars, semi-trucks, ships, submarines, aircraft, dirt bikes, All Terrain Vehicles (ATV), scooters, and/or lawn mowers). Almost all typical vehicles comprise a battery, for example, and would thus qualify as "electric vehicles". Similarly, the term "electric car" as utilized herein may generally refer to any electric vehicle that may suitably be described as a car. This may include, in some embodiments, passenger cars of any size or class or configuration, passenger trucks such as pickup trucks, vans, etc. Some embodiments are more specifically directed to and/or may be particularly advantageously applied to certain types or classes of electric vehicles and/or electric cars. Electric-drive vehicles or "True Electric Cars (TEC)", for example, comprise a class of vehicles that derive power (and thus motion) by utilizing one or more electric motors. Some electric-drive vehicles may store energy for powering such motors in one or batteries (the typical configuration for a TEC). Some electric-drive vehicles may instead utilize power obtained from operation of a small internal combustion engine, fuel cell, or the like. This class of vehicle is typically referred to as a "hybrid" electric vehicle.

Some embodiments described herein are associated with a "control system". As used herein, the term "control system" may generally refer to any combination of hardware, software, firmware, and/or microcode that is operative to carry out and/or facilitate embodiments described herein. For example, a control system may comprise a processor performing instructions of a program to facilitate intelligent vehicle charging. The control system may comprise, according to some embodiments, a single device and/or component or may comprise any practicable number of networked devices.

Some embodiments described herein are associated with a "network device". As used herein, the term "network device" may generally refer to any device that can communicate via a network. Examples of network devices include a PC, a workstation, a server, a printer, a scanner, a facsimile machine, a copier, a PDA, a storage device (e.g., a disk drive), a hub, a router, a switch, and a modem or a wireless phone. In some embodiments, network devices may comprise one or more network components, such as a Static Random Access Memory (SRAM) device or module, a network processor, and/or a network communication path, connection, port, or cable. Some examples of network devices may include, but are not limited to, servers or controllers, customer devices, vehicles and/or vehicle components, input devices, output devices, and peripheral devices.

As used herein, the terms "server" and "controller" may be used interchangeably and may generally refer to any device that may communicate with one or more vehicles, PSE devices, ECS devices, one or more third-party servers, one or more remote controllers, one or more customer devices, one or more peripheral devices and/or other network nodes, and may be capable of relaying communications to and/or from each such device. A controller or server may, for example, comprise one or more network devices and/or components.

Some embodiments described herein are associated with an "input device". As used herein, the term "input device" may generally refer to any device that is used to receive or process input. An input device may communicate with and/or be part of another device (e.g., a wagering game device). Some examples of input devices include, but are not limited to: a button, a key, one or more softkeys and/or variable function input devices, a bar-code scanner, a magnetic stripe reader, a computer keyboard, a pointing device (e.g., a computer mouse, touchpad, and/or trackball), a point-of-sale terminal keypad, a touch-screen, a microphone, an infrared sensor, a sonic ranger, a computer port, a video camera, a motion detector, an accelerometer, a thermometer, a digital camera, a network card, a Universal Serial Bus (USB) port, a Global Positioning System (GPS) receiver, a Radio Frequency IDentification (RFID) receiver, a RF receiver, a pressure sensor, and a weight scale or mass balance.

Some embodiments described herein are associated with an "output device". As used herein, the term "output device" may generally refer to a device that is used to output information. An output device may communicate with and/or be part of another device. Some examples of output devices may include, but are not limited to: a Cathode Ray Tube (CRT) monitor, a Liquid Crystal Display (LCD) screen, a Light Emitting Diode (LED) screen, a printer, an audio speaker (or other sound or noise-producing device), an Infra-red Radiation (IR) transmitter, a RF transmitter, a vibration device, an olfactory emitter, and/or a data port.

It should be understood that some devices may function and/or operate as both input and output devices. A touch-sensitive display device (or "touch screen"), for example, may both receive input by receiving pressure and/or electrostatic indications via a display screen and may also provide output such as graphics, text, and/or other data via the same display screen.

Some embodiments herein are associated with "communication". As used herein, the term "communication" may refer to any information, data, and/or signal that is provided, transmitted, received, and/or otherwise processed by an entity, and/or that is shared or exchanged between two or more people, devices, and/or other entities. Communications may be external to one or more devices, internal (e.g., within a device and/or component), wired, wireless, continuous, and/or intermittent. Communications may involve, for example, one or more of transmitting, receiving, relaying, processing, and/or otherwise interfacing with information and/or data. Some, but not all, possible communication networks that may be utilized for such communications include: a Local Area Network (LAN), a Wide Area Network (WAN), the Internet, a telephone line (e.g., a Public Switched Telephone Network (PSTN)), a cable line, a radio channel, an optical communications line, and/or a satellite communications link. A variety of communications protocols may be utilized to facilitate and/or conduct such communications, including but not limited to: Ethernet (or IEEE 802.3), Internetwork Packet Exchange IPX), Service Advertising Protocol (SAP), Asynchronous Transfer Protocol (ATP), Bluetooth®, and/or Transmission Control Protocol (TCP)/Internet Protocol (IP). Communications may be encrypted to ensure privacy and prevent fraud in any of a variety of ways that are or become known or practicable.

Devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

As used herein, the terms "information" and "data" may be used interchangeably and may refer to any data, text, voice, video, image, message, bit, packet, pulse, tone, waveform, and/or other type or configuration of signal and/or information. Information may be or include information packets transmitted, for example, in accordance with the IP Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As used herein, the term "coupled" may generally refer to any type or configuration of coupling that is or becomes known or practicable. Coupling may be descriptive, for example, of two or more objects, devices, and/or components that are communicatively coupled, mechanically coupled, electrically coupled, and/or magnetically coupled. The term "communicatively coupled" generally refers to any type or configuration of coupling that places two or more objects, devices, components, or portions, elements, or combinations thereof in communication. Mechanical, electrical, and magnetic communications are examples of such communications. The term "mechanically coupled" generally refers to any physical binding, adherence, attachment, and/or other form of physical contact between two or more objects, devices, components, or portions, elements, or combinations thereof.

The term "electrically coupled" indicates that one or more objects, devices, components, or portions, elements, or combinations thereof, are in electrical contact such that an electrical signal, pulse, or current (e.g., electrical energy) is capable of passing between the one or more objects, enabling the objects to electrically communicate with one another. In some embodiments, electrical coupling may enable electrical energy to be transmitted wirelessly between two or more objects and/or devices. The term "magnetically coupled" indicates that one or more objects, devices, components, or portions, elements, or combinations thereof, are within one or more associated magnetic fields. Objects may be electrically and/or magnetically coupled without themselves being physically attached or mechanically coupled. For example, objects may communicate electrically through various wireless forms of communication or may be within (at least partially) a magnetic field, without being physically touching or even adjacent.

III. General Electrical Distribution Systems

Referring first to FIG. 1, a block diagram of a system 100 according to some embodiments is shown. The various systems described herein are depicted for use in explanation, but not limitation, of described embodiments. Different types, layouts, quantities, and configurations of systems described herein may be utilized without deviating from the scope of some embodiments.

According to some embodiments, the system 100 may comprise one or more power sources 102 that are coupled to provide electrical power to one or more power distribution networks 104, which are commonly referred to as electrical "grids". Such electrical grids 104 may, in some embodiments, be coupled via inter-grid distribution lines 106. While such inter-grid power transfer couplings are generally referred to as transmission lines, it should be understood that other forms of inter-grid power transfer couplings may also or alternatively be utilized, whether or not they actually comprise lines, wires, or other physical electrical conduits (e.g., RF and/or microwave wireless power transmission).

In some embodiments, the system 100 may comprise one or more electrical demands or loads and/or types of such loads to which the electrical grid 104 provides electrical energy. The system 100 may comprise, for example, a residential demand 110, a transportation demand 120, an industrial demand 130, and/or a commercial demand 140. In some embodiments, the system 100 may comprise fewer or more types of electrical demands 110, 120, 130, 140 than are shown in FIG. 1. According to some embodiments, any of the various types of electrical demands 110, 120, 130, 140 may be comprised of one or more electrical loads, nodes, and/or other types and/or configurations of electrical demands.

In some embodiments, electrical energy from the one or more power sources 102 may be "intelligently" directed, via the grid 104 (and/or specific components thereof not explicitly shown in FIG. 1), to selected electrical nodes or loads and/or to selected types of electrical demands 110, 120, 130, 140. According to some embodiments, one or more of the electrical demands 110, 120, 130, 140 may communicate with the grid 104 to schedule specific known and/or estimated electrical demands or loads. Such scheduling may, for example, be configured to reduce the cost of any such specific known and/or estimated electrical demands or loads (e.g., by taking advantage of time-of-day rates) and/or may be configured to more efficiently manage electrical generation (e.g., by the one or more power sources 102) and/or transmission (e.g., via the grid 104).

Figure 2:
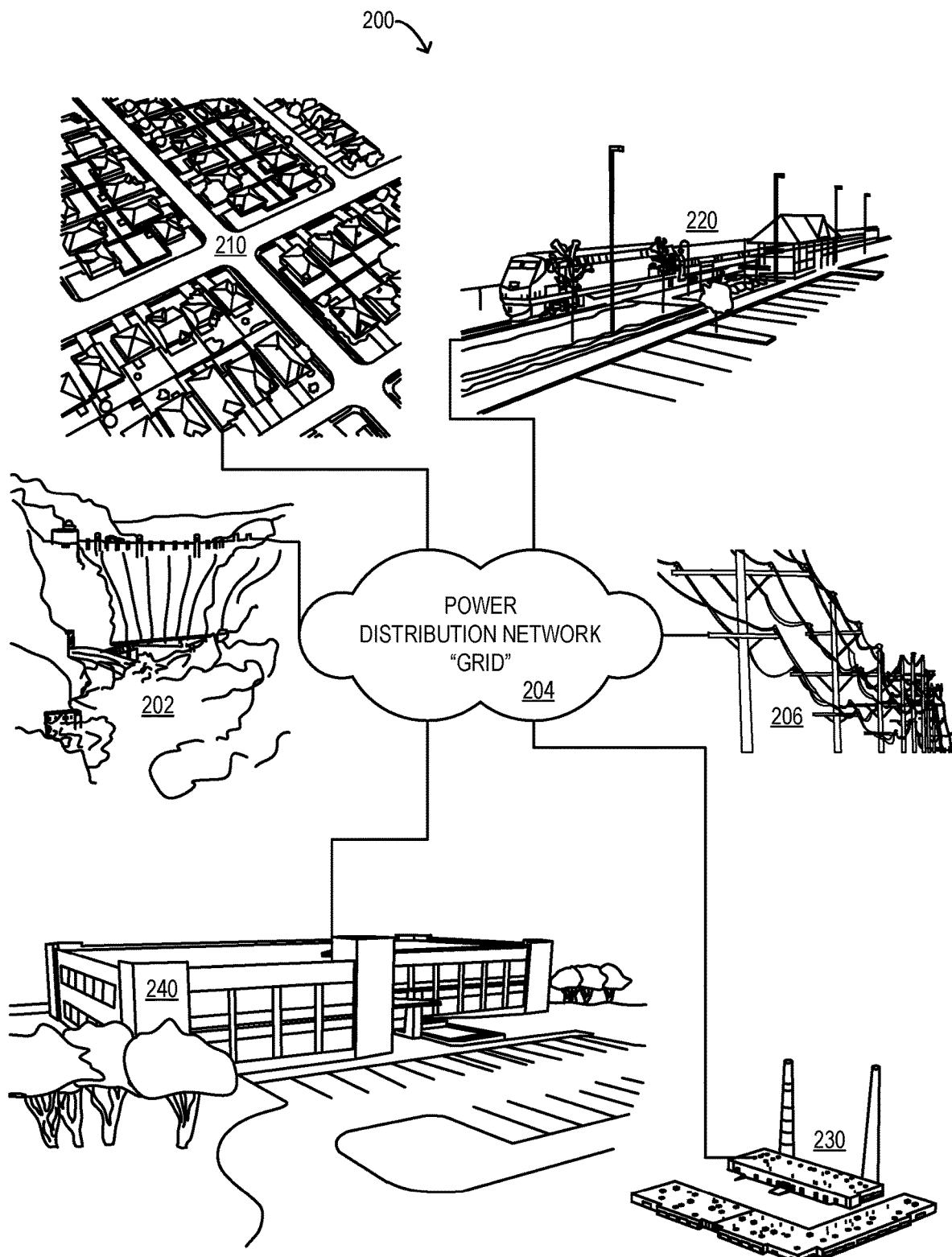
FIG. 2 is a block diagram of a system according to some embodiments.

Turning to FIG. 2, a block diagram of a system 200 according to some embodiments is shown. In some embodiments, the system 200 may be similar in configuration and/or functionality to the system 100 of FIG. 1. As shown in FIG. 2, for example, the system 200 may comprise a hydroelectric facility 202 coupled to provide power to a power distribution network/grid 204. The system 200 may also or alternatively comprise transmission lines 206, which may for example, carry electrical energy from the hydroelectric facility 202 to and/or through the grid 204 and/or to one or more other grids (not shown in FIG. 2). The transmission lines 206 may also or alternatively carry electrical energy to one or more of a residential subdivision 210, an electric train facility 220 (e.g., a train station and/or electric train tracks—"third" rails and/or overhead lines), a factory 230, and/or an office building 240. In some embodiments, any or all components 202, 204, 206, 210, 220, 230, 240 of the system 200 may be similar in configuration and/or functionality to any similarly named and/or numbered components of FIG. 1.

According to some embodiments, electrical energy from the hydroelectric facility 202 may be "intelligently" directed by the grid 204 to, for example, the office building 240. Such direction may be effectuated in response to one or more specific parameters such ed one or more specific characteristics associated with the hydroelectric facility 202 and/or the office building 240. Such direction may be effectuated via management of one or more electrical switching devices (not explicitly shown in FIG. 2) or may only be "virtually" directed (or re-directed). The grid 204 may, for example, cause one or more electrical switches or gates to be activated (or deactivated), thus sending power from the hydroelectric facility 202 to the office building 240. Some or all of the electrical energy from the hydroelectric facility 202 may be directed to the office building 240 in such a manner.

In some embodiments, the direction of the electrical energy may only be "virtual". While no specific electrical switching may be effectuated, for example, and thus no specific electrical energy may be directed (or re-directed), the office building 240 may be specifically allotted an amount of energy produced by the hydroelectric facility 202. Such "virtual" redirection is similar to the currently utilized process of allocating or attributing a certain amount of energy from a certain type of power source to a specific customer and/or load (e.g., such as when electric utility customers designate that "their" energy come only from renewable power sources).

In some embodiments, the office building 240 (and/or the residential subdivision 210, the electric train facility 220, and/or the factory 230) may be tasked with and/or configured to charge electric, hybrid-electric, and/or other types of vehicles. The parking lot shown at the office building 240 may, for example, be outfitted to charge one or more vehicles (not shown in FIG. 2) parked therein. In such embodiments, the office building 240 (and/or an entity associated therewith, such as a parking lot management company) may communicate with the grid 204 to schedule and/or otherwise manage the charging of the vehicles.

IV. Electric Car Charging Systems

Figure 3:
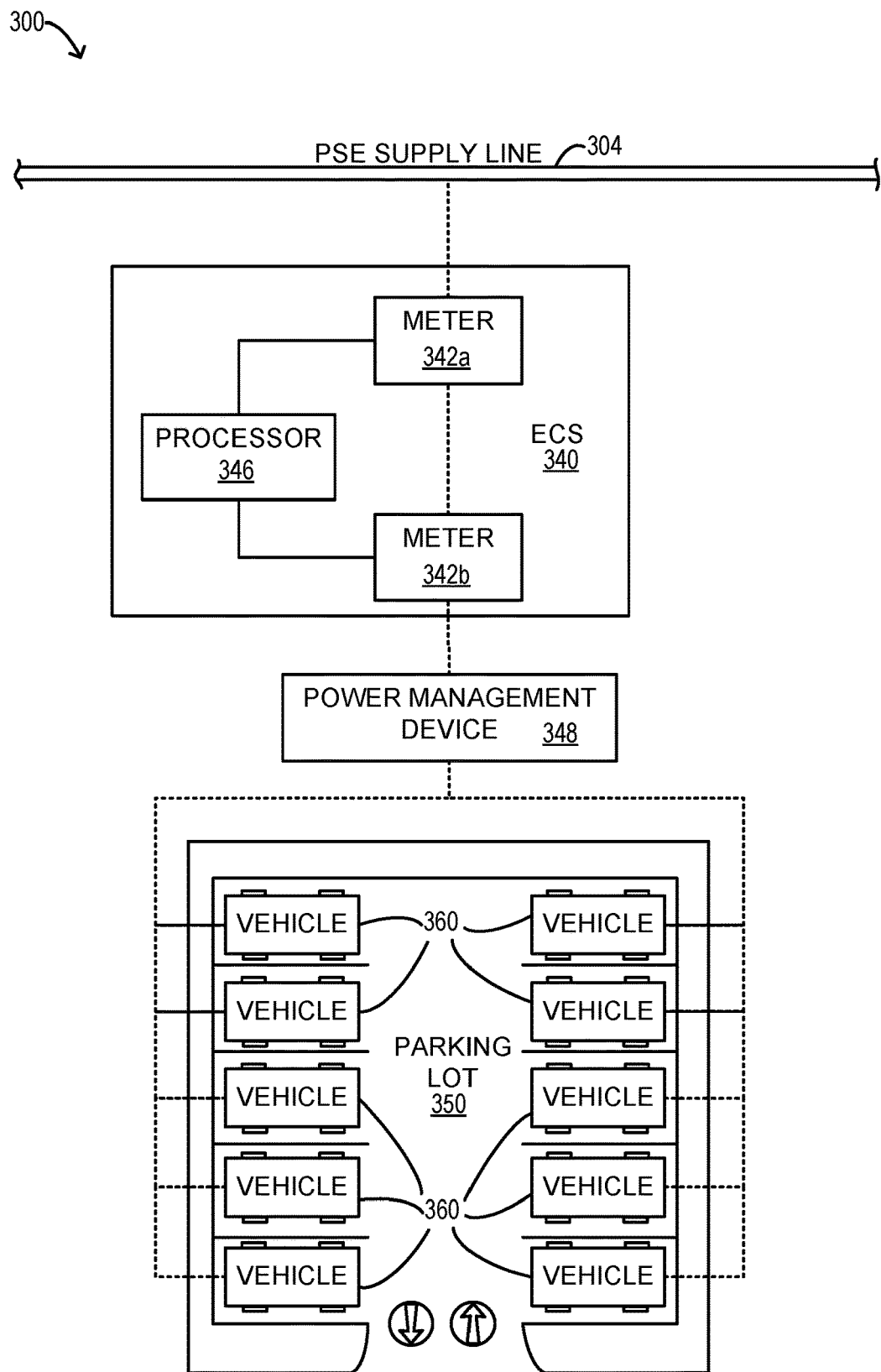
FIG. 3 is a block diagram of a system according to some embodiments.

Referring to FIG. 3, for example, a block diagram of a system 300 according to some embodiments is shown. In some embodiments, the system 300 may be similar in configuration and/or functionality to the systems 100, 200 of FIG. 1 and/or FIG. 2 herein. As shown in FIG. 3, for example, the system 300 may comprise a Power Supplying Entity (PSE) supply line 304 coupled to provide power to an Electrical Charging System (ECS) 340. The ECS 340 may comprise one or more electrical meters 342a-b and/or a processor 346.

In some embodiments, the ECS 340 may also comprise or be associated with a power management device 348. The system 300 may also or alternatively comprise a parking lot 350 containing one or more parked vehicles 360. In some embodiments, any or all components 304, 340 of the system 300 may be similar in configuration and/or functionality to any similarly named and/or numbered components of FIG. 1 and/or FIG. 2 herein.

According to some embodiments, the system 300 may be utilized to provide electrical charging services to the one or more vehicles 360. It should be understood that fewer or more vehicles 360 than are shown in FIG. 3 may be included in the system 300. In some embodiments, the ECS 340 and/or the power management device 348 may communicate with one or more of the vehicles 360 and/or may otherwise obtain information associated with the one or more vehicles 360. The ECS and/or the power management device 348 may, for example, electronically receive information from each vehicle 360 and/or may communicate with a server and/or controller (neither of which is explicitly shown in FIG. 3) to receive information associated with each vehicle 360. Such information may then, for example, be utilized to determine how and/or when to charge each vehicle 360.

In some embodiments, the ECS 340 may communicate with a PSE (e.g., that operates and/or provides the supply line 304) to determine time-of-day rates for purchasing electrical energy. The ECS 340 and/or the processor 346 thereof may then, for example, utilize the time-of-day rate information to determine a schedule for charging the one or more vehicles 360, such that the schedule results in the lowest estimated cost for charging the one or more vehicles 360. The ECS 340 may also or alternatively communicate with the PSE to otherwise develop a charging schedule such as to facilitate management of electrical energy generation (e.g., by assisting in flattening usage peaks or spikes) or making use of available excess capacity.

According to some embodiments, the processer 346 may communicate with the electrical meters 342a-b to determine where any electrical energy required by the ECS 340 should be drawn from. In some embodiments, the processor 346 may be included in a single device with one or more of the electrical meters 342a-b (e.g., the combination comprising a single "smart" meter). In the case that one or more of the vehicles 360 comprise batteries and/or electrical generation capabilities (e.g., solar panels), for example, the ECS 340 may have the option of drawing electricity from the supply line 304 or the parking lot 350 (e.g., the collective power available from the vehicles 360). In some embodiments, the processor 346 may determine which available source has cheaper and/or otherwise more desirable energy (e.g., from "green" sources).

In some embodiments, the power management device 348 may comprise one or more transformers, inverters, filters, switches, gates, and/or other electrical load balancing and/or management devices. The power management device 348 may comprise, for example, an inverter for converting Alternating Current (AC) energy to Direct Current (DC) energy, and/or vice versa. It is anticipated, in accordance with some embodiments, that electric vehicles, hybrid-electric vehicles, and/or other vehicles requiring electrical charging (and/or providing electrical energy) may be configured to require (and/or provide) DC energy (e.g., provided to and/or from one or more batteries).

In some embodiments, the power management device 348 may manage the charging of the vehicles 360. The In some embodiments, the power management device 348 may, for example, communicate with the vehicles 360 to determine charging requirements and/or may couple to the vehicles to provide wired and/or wireless electrical energy transfer (e.g., charging). In some embodiments, the power management device 348 may also or alternatively manage (alone or in coordination with or conjunction with the processor 346 and/or the electrical meters 342a-b) the flow of electrical energy between the parking lot 350 and the ECS 340.

The power management device 348 may, such as in the case that at least some of the vehicles 360 are equipped to provide electrical energy (e.g., via electrical generation devices and/or from on-board stored energy sources) for example, utilize any energy provided by one or more vehicles 360 to satisfy (in part or in whole) the charging demands of one or more other vehicles 360. Any net extra energy provided by the parking lot 350 may then, for example, be provided for use by the ECS 340 and/or for selling back to the PSE via the supply line 304.

Figure 4:
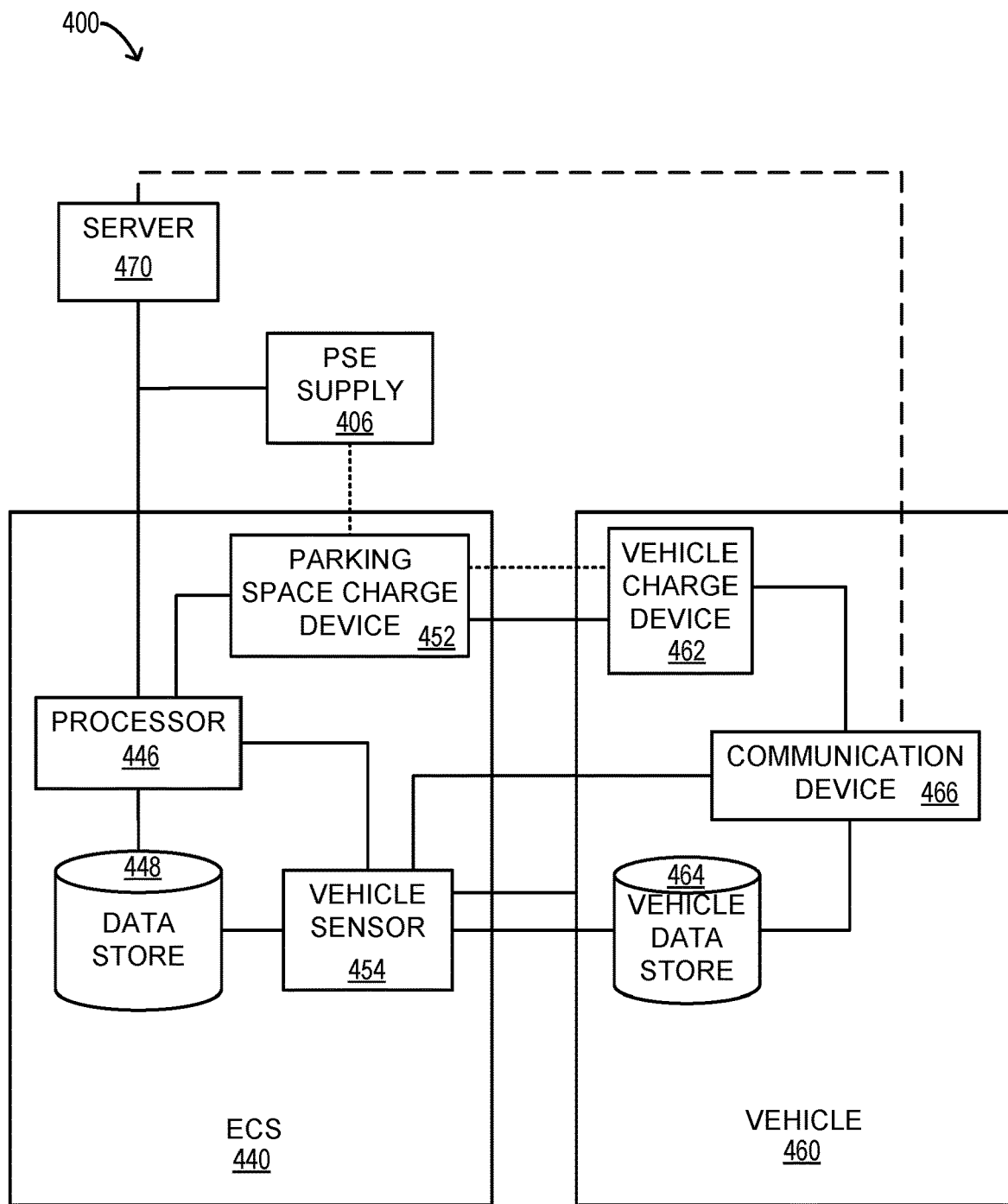
FIG. 4 is a block diagram of a system according to some embodiments.

Turning now to FIG. 4, a block diagram of a system 400 according to some embodiments is shown. In some embodiments, the system 400 may be similar in configuration and/or functionality to the systems 100, 200, 300 of FIG. 1, FIG. 2, and/or FIG. 3 herein. As shown in FIG. 4, for example, the system 400 may comprise a PSE supply 404 coupled to provide power to an ECS 440. The ECS 440 may comprise various components such as a processor 446 and/or a data store 448. In some embodiments, the ECS 440 may comprise and/or the PSE supply 404 may provide power directly to one or more parking space charge devices 452. The ECS 440 may, in some embodiments, comprise one or more vehicle sensors 454. According to some embodiments, the system 400 may comprise one or more vehicles 460. Any or all of the one or more vehicles 460 may comprise a vehicle charge device 462, a vehicle data store 464, and/or a communication device 466. The system 400 may also or alternatively comprise a server 470. In some embodiments, any or all components 404, 440, 446, 448, 460 of the system 400 may be similar in configuration and/or functionality to any similarly named and/or numbered components of FIG. 1, FIG. 2, and/or FIG. 3 herein.

In some embodiments, the ECS 440 may be coupled to provide and/or receive electric energy to/from the vehicle 460. As shown in FIG. 4, for example, the parking space charge device 452 may be physically and/or electrically coupled to the vehicle 460 and/or the vehicle charge device 462 thereof. The parking space charge device 452 may, in some embodiments, comprise a wireless charging device configured and coupled to provide electrical energy to the vehicle 460 and/or the vehicle charge device 462 and/or may comprise a physically coupling device configured to mate with the vehicle 460 and/or the vehicle charge device 462.

According to some embodiments, the vehicle sensor 454 may be coupled (such as in and/or near a parking space) to detect an arrival, proximity, and/or presence of the vehicle 460. The vehicle sensor 454 may, for example, comprise a magnetically actuated device that reacts to the large volume of metal that many vehicles are comprised of, and/or may comprise a pressure sensor (e.g., to detect the weight/mass of the vehicle 460), a motion sensor (which may include both electrical and non-electric devices), and/or other electronic devices. In some embodiments, the vehicle sensor 454 may comprise a communication device such as a Bluetooth® and/or passive-inductive device that is operable to detect the presence of the vehicle 460 utilizing wireless interrogation methodologies. In such a manner, for example, the vehicle sensor 454 may communicate with the communication device 466 and/or the vehicle data store 464, both of the vehicle 460.

According to some embodiments, the vehicle sensor 454 may receive data from the communication device 466 and/or the vehicle data store 464. The vehicle sensor 454 may receive, for example, an indication of an identifier of the vehicle 460 such as a Vehicle Identification Number (VIN), a license plate number, an electric utility account number, an EZ-Pass® account and/or tag number, and/or another identifier or account number such as a PayPal® account number. Such identifying information may be stored, for example, in the vehicle data store 464 and may be communicated directly to the vehicle sensor 454 of the ECS 440 or via the communication device 466 of the vehicle 460. In some embodiments, other information may also or alternatively be provided by the vehicle 460 to the ECS 440. Preference data defining, at least in part for example, desired vehicle charging parameters, charging schedules, and/or rules regarding how, when, and/or where (e.g., designating specific parking spaces and/or parking lots) the vehicle 460 should be charged and/or how, when, and/or where electrical energy should be received from the vehicle 460 (e.g., via generation of energy by the vehicle 460 and/or via discharging of one or more batteries or capacitors on the vehicle 460).

In some embodiments, preference data may be received from the vehicle 460 (e.g., as stored in the vehicle data store 464 and/or may be retrieved and/or looked-up in the data store 448 of the ECS 440 and/or via the server 470. The processor 446 may, for example, utilize an identifier of the vehicle 460 (e.g., received by the vehicle sensor 454) to query the vehicle data store 464, the data store 448, and/or the server 470. Preference data associated with the identifier of the vehicle 460 may accordingly be identified, selected, retrieved, and/or otherwise determined (e.g., encoded and/or encrypted identification and/or preference data may be retrieved and then decoded and/or decrypted as needed).

According to some embodiments, the processor 446 may utilize the identification and/or preference data to determine, select, calculate, and/or otherwise derive a charging schedule for the vehicle 460. Similarly, in the case that the vehicle 460 is configured to provide electrical energy to the ECS 440, the processor 446 may utilize the identification and/or preference data to determine, select, calculate, and/or otherwise derive a schedule and/or routine (e.g., rules-based strategy) for receiving electrical energy from the vehicle 460.

In some embodiments, the processor 446 may determine (e.g., by communicating with the PSE associated with the PSE supply 404) available market rates (e.g., a time-of-day and/or usage-based rate schedule) for purchasing electrical energy from the PSE supply 404. The processor 446 may utilize such rate information in combination with the identification and/or preference information, for example, to determine the most cost-effective schedule for charging the vehicle 460. In the case that the preference information includes an indication of how much energy is desired to be stored by the vehicle 460 by a certain time, the processor 446 may calculate an estimated time to achieve the desired charge and may identify when, during the available charging window (e.g., a time window bounded by the current time and the desired total charge end time) would be most cost effective (e.g., cheapest) to acquire the desired estimated charge.

According to some embodiments, such as in the case one or more vehicles 460 in a parking lot (and/or adjacent lots or otherwise within a proximity) are scheduled to charge while one or more other vehicle 460 are scheduled to provide electrical energy to the ECS 440, the processor 446 may determine the charging schedule of a vehicle 460 based at least in part on information regarding electrical energy provisioning by one or more other vehicles 460. In the case that it is determined that a vehicle 460 requires an amount of charge 'A', for example, and that one or more other vehicles 460 are estimated to be capable of providing the amount of charge 'A', the processor 446 may determine that the most cost-effective way of providing the charge to the vehicle 460 is to direct electrical energy from the one or more providing vehicles 460 to the vehicle in need of charge. A rate table and/or other rate and/or cost information associated with and/or descriptive of the provision of electrical energy from one or more vehicles 460 (e.g., directly) to one or more other vehicles 460 may be utilized to facilitate a determination of whether purchasing power from the PSE would be more or less cost-effective than purchasing and/or otherwise acquiring the required power from distributed generation sources such as other vehicles 460 parked nearby (e.g., more near than the nearest source utilized by the PSE).

In some embodiments, such as in the case that the server 470 manages and/or coordinates multiple ECS 440 facilities, the server 470 may communicate with the PSE supply 406 (and/or another or different device owned and/or operated by the PSE) to determine and/or facilitate determination and/or calculation of vehicles charging schedules. In such a manner, for example, the server 470 may be able to negotiate better rates and/or sooner charging times with the PSE by leveraging bulk electrical energy purchasing.

According to some embodiments, vehicle identification information and/or vehicle charging preferences and/or parameters may be communicated to the server 470 (and/or data store 448 of the ECS 440) via the communication device 466 of the vehicle 460. An operator of the vehicle 460 whom defines and/or provides such identification and/or preference information, for example, may utilize a navigational and/or other touch-screen or communication device 466 of the vehicle 460 to select, program, define, and/or transmit the desired data. In some embodiments, the communication device 466 may comprise a wireless and/or cellular communication device 466 such as an OnStar® system and/or a cellular telephone operated in proximity to the vehicle 460 (e.g., connected through the vehicle via Bluetooth® technology such as utilized by Uconnect® systems).

Figure 5:
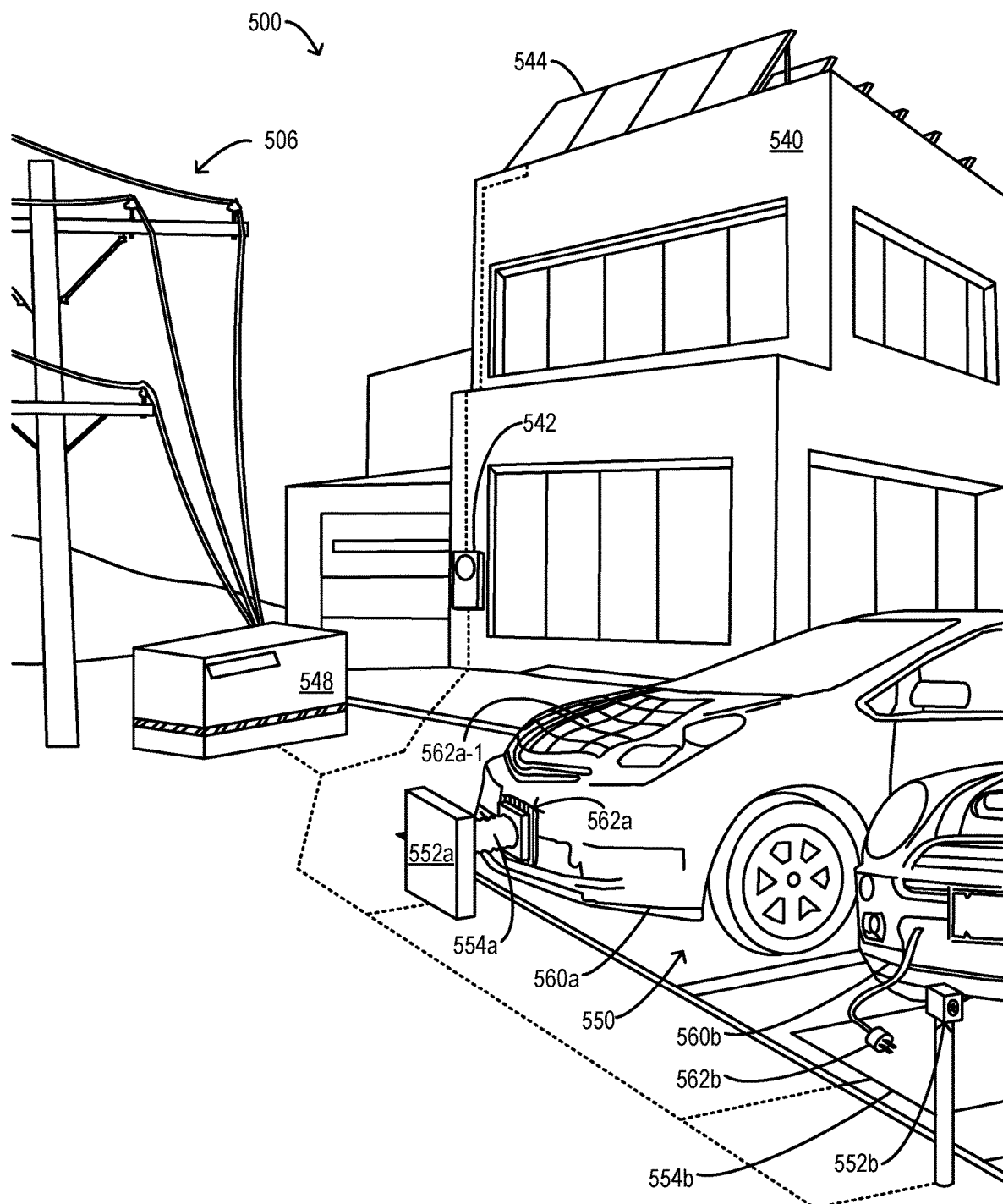
FIG. 5 is a perspective diagram of a system according to some embodiments.

Referring to FIG. 5, a block diagram of a system 500 according to some embodiments is shown. In some embodiments, the system 500 may be similar in configuration and/or functionality to the systems 100, 200, 300, 400 of FIG. 1, FIG. 2, FIG. 3, and/or FIG. 4 herein. As shown in FIG. 5, for example, the system 500 may comprise a PSE supply line 504 coupled to provide power to an ECS 540. The ECS 540 may comprise various components such as a meter 542. In some embodiments, the ECS 540 may comprise and/or the PSE supply line 504 may provide power directly to a power management device 548. In some embodiments, the ECS 540 may also or alternatively generate power such as via one or more distributed generation devices 544 (such as internal combustion generators, batteries, and/or renewable energy generators such as wind, hydro, and/or solar (as shown) generators).

The ECS 540 may, in some embodiments, comprise and/or be associated with a parking lot 550 comprising one or more parking space charge devices 552a-b and/or one or more vehicle sensors 554a-b. According to some embodiments, the system 500 may comprise one or more vehicles 560a-b. Any or all of the one or more vehicles 560a-b may comprise a vehicle charge device 562a-b. Some vehicles 560a-b (or all vehicles 560a-b), such as the first vehicle 560a depicted in FIG. 5, may comprise a vehicle charge device 560a-1 that is operable to generate and/or otherwise provide electrical energy (e.g., to the ECS 540 and/or to the PSE supply line 506). In some embodiments, any or all components 504, 540, 542, 548, 550, 552a-b, 554, 560a-b, 562a-b of the system 500 may be similar in configuration and/or functionality to any similarly named and/or numbered components of FIG. 1, FIG. 2, FIG. 3, and/or FIG. 4 herein.

In some embodiments, such as shown in FIG. 5, the ECS 540 may comprise an office and/or other building that includes and/or is otherwise associated with the parking lot 550 for vehicles 560a-b. The office building 540 may typically receive electrical power from the PSE supply line 506 via the power management device 548, which may comprise (as depicted) a transformer (e.g., to step-down the voltage of the PSE supply line 506 to the desired voltage for utilization by the office building 540). The electrical energy flowing from the transformer 548 into the office building 540 may generally be monitored, tabulated, and/or recorded by the meter 542. In some embodiments, such as in the case that the office building 540 generates electrical power, such as via the distributed generation solar panels 544, the meter 542 may also monitor, tabulate, and/or record electrical energy provided and/or sold back to the PSE supply line 506 (e.g., a meter 542 than can record bi-directional electrical flow and/or that can run backwards). In the case that the power management device 548 functions as an inverter to convert DC energy produced by the solar panels 544 into AC energy, the meter 542 may be positioned on the PSE-side of the electrical circuit (e.g., as opposed to the ECS-side of the circuit as shown in FIG. 5).

In some embodiments, the parking space charge devices 552a-b may be positioned and/or configured to provide electrical energy from the PSE supply line 504 and/or the transformer/inverter 548 to the vehicles 560a-b. As shown in FIG. 5, the parking space charge devices 552a-b may be provided in various forms and/or PATENT configurations. A first parking space charge device 552a may comprise a fixed-position, shock-absorbing electrical contact device that is designed to physically and electrically couple with the first vehicle 560a, for example. The first vehicle charge device 562a of the first vehicle 560a may be configured to mate and/or otherwise couple with the first parking space charge device 552a such as by utilizing flat-plate contact and/or other forms of electrical connections (e.g., male/female connections of any know or practicable type).

According to some embodiments, a second parking space charge device 552b may simply comprise an electrical outlet that is configured to accept a second vehicle charge device 562b of the second vehicle 560b. Further, while not specifically or explicitly depicted in FIG. 5, a parking space charge device 552a-b may be configured to provide wireless transmission of electrical power to and/or from a vehicle 560a-b.

In some embodiments, the vehicle charge device 562a-1 may comprise an electrical energy generation device (such as the hood-mounted/integrated solar panels as shown in FIG. 5) that is coupled to provide power to the first parking space charge device 552a. According to some embodiments, the vehicle charge device 562a-1 may comprise any device capable of providing electrical energy such as a battery, a capacitor, an engine powering an alternator, a wind power device, etc.

In some embodiments, as described herein, the vehicle sensors 554a-b may detect a proximity and/or presence of the vehicles 560a-b and/or may communicate with the vehicles 560a-b (e.g., to receive and/or retrieve vehicle identification information and/or charging preference information). As shown in FIG. 5, a first vehicle sensor 554a may comprise a pressure sensor oriented and/or configured to detect a physical coupling of the first vehicle charge device 562a to the first parking space charge device 552a. In some embodiments, a second vehicle sensor 554b may comprise a ground-integrated pressure sensor (e.g., to detect the weight/mass of a parked second vehicle 560b) and/or may comprise a magnetically-actuated device to detect the presence of large metal/ferrous components typically to be integrated into the second vehicle 560b. In some embodiments, the second vehicle sensor 554b may comprise a plurality of different types of sensors and/or may also or alternatively comprise an electronic communication device such as a Bluetooth® transceiver and/or a camera. The second vehicle sensor 554b may also or alternatively be utilized as a parking space charge device 552a-b that, for example, provides wireless power transmission from underneath the second vehicle 560b.

V. Electric Car Charging Interfaces

Figure 6:
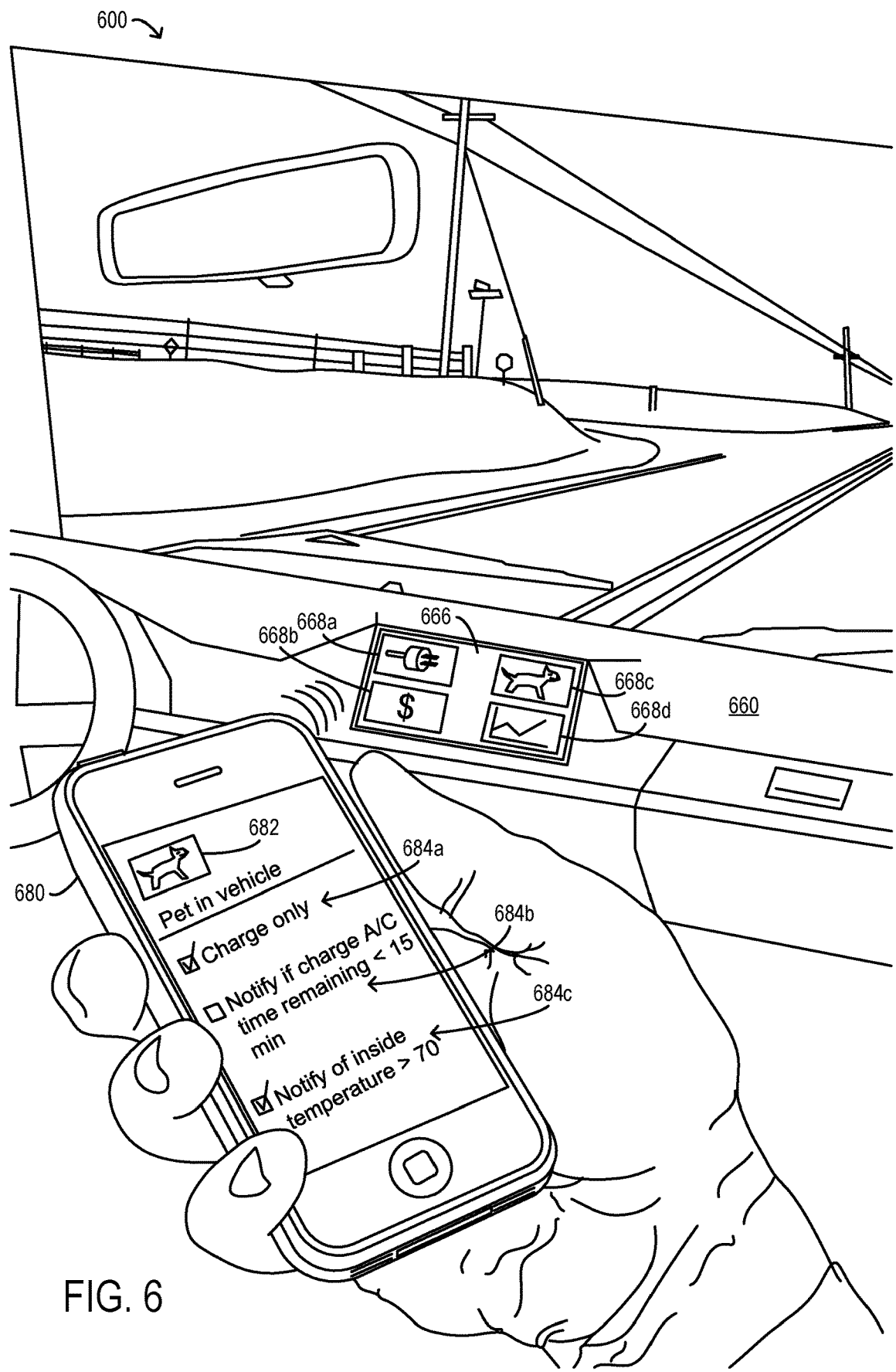
FIG. 6 is a perspective diagram of a system according to some embodiments.

Turning now to FIG. 6, a perspective diagram of a system 600 according to some embodiments is shown. In some embodiments, the system 600 may be similar in configuration and/or functionality to the systems 100, 200, 300, 400, 500 of FIG. 1, FIG. 2, FIG. 3, FIG. 4, and/or FIG. 5 herein. The system 600 may comprise, for example, a vehicle 660 (a portion of the interior of which is depicted in FIG. 6) comprising a communication device 666. In some embodiments, the communication device 666 may provide a plurality of available menu options 668a-d. The system 600 may comprise, in some embodiments, a user device 680 comprising one or more menu options 682 and/or one or more charging preference options 684a-c.

In some embodiments, the system 600 may be utilized to setup, define, store, and/or update or change preference, option, and/or parameter data that is utilized by an ECS (not shown in FIG. 6) to determine how, when, and/or where to transfer electrical energy to and/or from the vehicle 660. An operator of the user device 680 may, for example, select the menu option 682 (and the user device 680 may receive an indication of such selection), which is depicted as being a menu option defining a situation of a pet being in the vehicle 660. The operator may then, for example, (i) determine whether it is desired that the vehicle 660 only be allowed to be charged in such a circumstance—as opposed to allowing the vehicle 660 to provide and/or sell stored and/or vehicle-generated power (e.g., the first preference option 684a), (ii) determine whether it is desired that the operator be notified if the current charge level of the vehicle 660 falls below a level that allows the Air Conditioning (A/C) to remain on for fifteen (15) minutes (e.g., the second preference option 684b), and/or (iii) determine whether it is desired that the operator be notified if the temperature inside the vehicle 660 climbs above seventy (70) degrees (e.g., the third preference option 684c).

In such a manner, for example, the user device 680 may receive indications of the desired parameters to be utilized in governing charging (and/or electrical transmission from) the vehicle 660. The user device 660 may then, for example, transmit indications of such preferences to a central server (not shown in FIG. 6; such as the server 470 of FIG. 4) and/or transmit indications of such preferences to the vehicle 660 (e.g., via the communication device 666). An ECS may accordingly access such preference data and utilize the data to manage, define, and/or govern how, when, and/or where electrical energy is transmitted to and/or from the vehicle 660.

In some embodiments, such preference data may be defined, stored, managed, and/or updated or changed via the communication device 666. The operator of the vehicle 660 may, for example, select a first menu option 668a to define settings regarding desired charge levels, charging times, desired travel distances and/or itineraries, etc. The operator of the vehicle 660 may also or alternatively select a second menu option 668b to define settings regarding rules and/or parameters governing how electrical energy should be sold to the ECS. The operator of the vehicle 660 may also or alternatively select a third menu option 668c to define settings regarding rules and/or parameters governing how electrical energy should be received and/or provided and/or what types of alerts should be established when a pet is on the vehicle (e.g., similar to the menu option 682 shown on the user device 680). The operator of the vehicle 660 may also or alternatively select a fourth menu option 668d to access current charge levels, battery statistics, charging history, electrical energy purchase and/or sale history, account balance information, etc.

Figure 7:
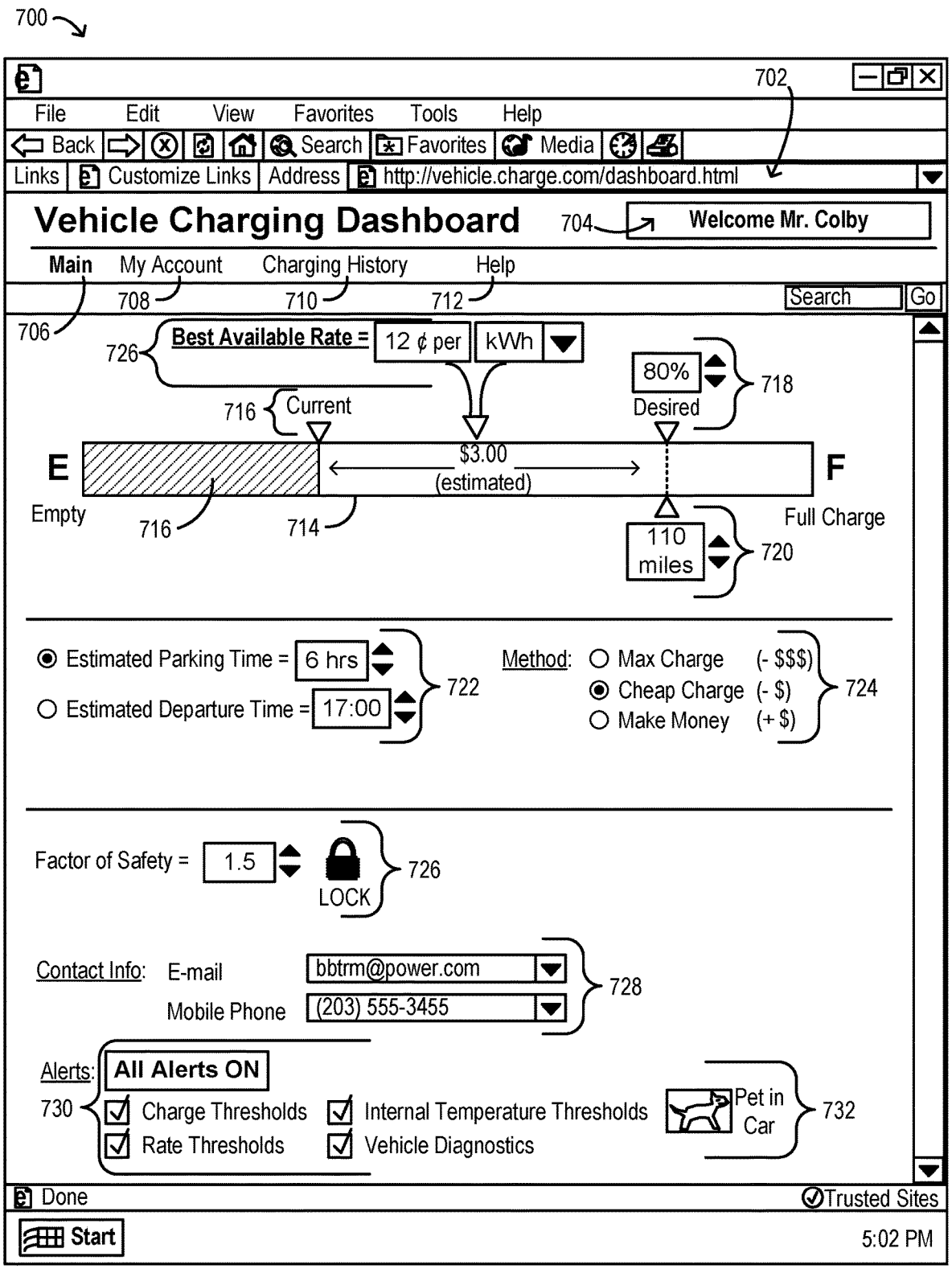
FIG. 7 is a diagram of an exemplary interface according to some embodiments.

Turning now to FIG. 7, a diagram of an exemplary interface 700 according to some embodiments is shown. In some embodiments, the exemplary interface 700 may be utilized in conjunction with and/or to effectuate and/or facilitate operation of the systems 100, 200, 300, 400, 500, 600 of FIG. 1, FIG. 2, FIG. 3, FIG. 4, FIG. 5, and/or FIG. 6 herein. The exemplary interface 700 may comprise, for example, a Uniform Resource Locator (URL) address bar 702 that shows the current Internet address of the displayed interface 700, a personalized welcome bar 704, and/or various menu and/or tab option such as a "main" menu item 706, a "My Account" menu item 708, a "charging history" menu item 710, and/or a "help" menu item 712.

The "My Account" menu item 708 may generally, for example, contain data descriptive of account setup and/or preference data such as billing parameters, contact information, etc. The "charging history" menu item 710 may generally contain data descriptive of metrics regarding how, when, and/or where a vehicle has been interfaced with an ECS. The "help" menu item 712 may generally provide data regarding help and assistance for using the interface 700 and/or for setting up various vehicle charging parameters and/or preferences.

In some embodiments, the "main" menu item 706 may comprise a "dashboard" and/or primary screen via which vehicle charging parameters may be established, stored, viewed, and/or changed. The "main" menu item 706 may comprise, for example, a vehicle charge indicator 714 that visually indicates a current charge level 716 of the vehicle. Similarly, a desired charge percent level 718 may be both shown and alterable. A user may select the desired charge percent level 718, for example, and may slide the marker on the vehicle charge indicator 714 to a new described location and/or may utilize the exemplary up/down arrow controls to increase or decrease the desired charge percent level 718.

The user may also or alternatively view and/or change the desired charge range level 720. An estimate of how far the vehicle can travel on a given charge amount (which may be a general average and/or may be computed based on a specific itinerary and/or past driving habits) can be determined, for example, and utilized to express the desired charge level in terms of distance capable of being traveled. In such a manner, for example, a user may determine a desired distance to travel (e.g., how far it is from home to work or vice versa) and may set the desired charge range level 720 to match the desired distance.

In some embodiments, the "main" menu item 706 may comprise a time to charge definition field 722. Knowing, for example, that the vehicle will be sitting in a parking lot at the user's workplace for the next six (6) hours, an ECS may determine when would be most cost-effective and/or otherwise desirably during that charging window to provide the necessary electrical energy to the vehicle. In some embodiments, the ECS may determine that the window is too short to provide the necessary charge (e.g., even if the entire charging window was to be utilized to charge the vehicle) and may notify (e.g., via the interface 700) the user of the potential problem/deficiency. As shown in FIG. 7, the time to charge definition field 722 may provide the user with several options such as defining the time to charge in terms of number of parked hours expected and/or in terms of expected departure time.

In some embodiments, the "main" menu item 706 may comprise a monetary charge setting field 724. The monetary charge setting field 724, for example, may allow the user to specify whether the vehicle should be charged as much as possible during the charging window and/or otherwise charged regardless of energy rate costs, whether the vehicle should be charged "intelligently" during the charging window to minimize energy rate costs (e.g., taking advantage of time-of-day energy rates), and/or whether the vehicle should be allowed to sell energy to make money for the user (e.g., by providing energy generated by the vehicle and/or by depleting battery levels of the vehicle to some specified minimum amount).

In some embodiments, the "main" menu item 706 may comprise a factor of safety field 726 via which the user may set a factor of safety to be utilized in calculations regarding charging levels and schedules for the vehicle. The "main" menu item 706 may also or alternatively comprise contact information 728 for the user. The contact information 728 may be utilized by the interface 700 (and/or an ECS), for example, to send alerts and/or messages to the user and/or other designated parties. The "main" menu item 706 may comprise, for example, an alerts field 730 that allows the use to specify various conditions and/or events that may trigger alerts and/or actions with respect to the vehicle. The user may turn "All Alerts On", for example, and/or may individually activate (i) charge thresholds (e.g., minimum, maximum, and/or desired charge thresholds), (ii) rate thresholds (e.g., minimum, maximum, and/or desired rate thresholds), (iii) internal temperature thresholds e.g., minimum, maximum, and/or desired temperature thresholds), and/or (iv) vehicle diagnostics (e.g., poor battery health, low oil, low tire pressure, alarm conditions, and/or maintenance reminders).

As shown in FIG. 7, the "main" menu item 706 may comprise a "pet in car" button 732. The "pet in car" button 732 may, for example, automatically set alerts and/or charge parameters to levels conducive to maintaining the comfort and safety of a pet left in a parked vehicle. In such a manner, for example, a user may safely leave a pet in a parked vehicle by establishing and/or setting charging parameters designed to keep the NC on to maintain a cool vehicle and/or to keep the heat on to maintain a warm vehicle (e.g., depending upon the relevant season and/or external weather conditions).

The interface 700 may receive indications of any or all desired parameters, options, and/or settings designated and/or defined by a user. Such information may then, for example, be stored in relation to an identifier of the vehicle and/or the user and may accordingly be utilized by an ECS (or a plurality of ECS facilities) to mange transmission of electrical energy to and/or from one or more desire vehicles.

VI. Processes

Various embodiments will now be described with references to methods, procedures, and/or processes associated with some embodiments. The methods, procedures, and/or processes described herein may generally be performed by any of the systems 100, 200, 300, 400, 500, 600 of FIG. 1, FIG. 2, FIG. 3, FIG. 4, FIG. 5, and/or FIG.6 and/or any of the many components and/or specific devices described herein. Other configurations of systems and devices may also or alternatively be utilized to perform the methods described herein without deviating from the scope of some embodiments. The procedures described herein do not necessarily imply a fixed order to the actions, and embodiments may be performed in any order that is practicable. Note that any of the methods described herein may be performed by hardware, software (including microcode), firmware, or any combination thereof. For example, a storage medium may store thereon instructions that when executed by a machine result in performance according to any of the embodiments described herein.

Figure 8:
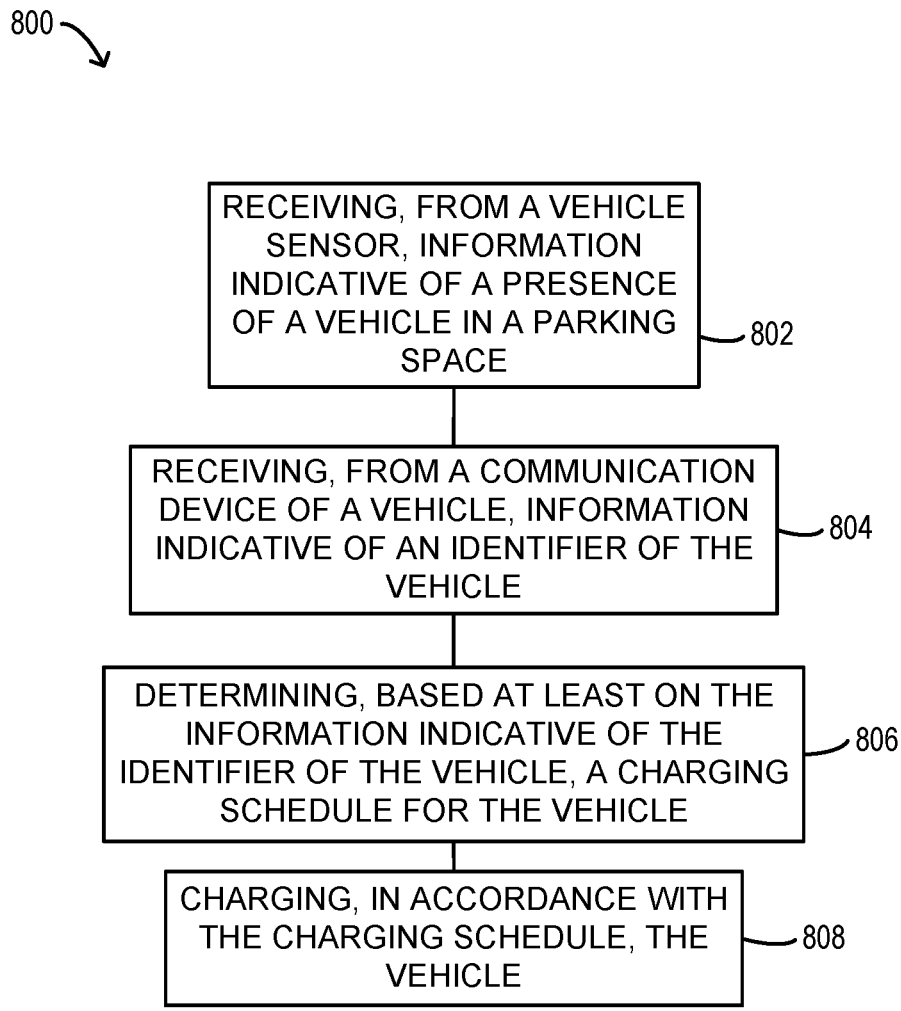
FIG. 8 is a flow diagram of a method according to some embodiments.

Referring to FIG. 8, for example, a flow diagram of a method 800 according to some embodiments is shown. The method 800 may be performed, for example, by an ECS and/or one or more components thereof as described herein. In some embodiments, the method 800 may comprise receiving (e.g., from a vehicle sensor) information indicative of a presence of a vehicle in a parking space, at 802. The sensor may detect proximity of the vehicle via motion sensing, pressure sensing, light sensing, metal detecting, and/or wireless electronic transmission sensing, for example. In some embodiments, the sensor may detect an actual physical coupling of the vehicle to a charge management device, may detect an electrical coupling of the vehicle to the charge management device, and/or may detect and/or analyze a positioning of the vehicle (e.g., to determine whether the vehicle is properly positioned, oriented, and/or outfitted for charging services).

The method 800 may also or alternatively comprise receiving (e.g., from a communication device of a vehicle) information indicative of an identifier of the vehicle, at 804. Vehicle identification information may be read and/or scanned from a camera image of the vehicle or a portion thereof (e.g., a license plate and/or a VIN area), for example, and/or may be electrically determined such as by receiving signals from the vehicle. In some embodiments, charging preference and/or parameter information may also or alternatively be obtained. The vehicle identifier may be utilized to look-up the preference information, for example, and/or the preference information may be directly provided.

The method 800 may also or alternatively comprise determining, based at least on the information indicative of the identifier of the vehicle, a charging schedule for the vehicle, at 806. The preference information stored in relation to the vehicle identification information may, for example, be utilized to determine one or more rules and/or parameters that govern electrical transmissions to and/or from the vehicle (and/or a group or class of vehicles). In some embodiments, an ECS and/or control system may calculate, based on the charging parameters and/o preferences, how much energy the vehicle needs, how much energy is desired for the vehicle, when the needed and/or desired charge levels should be reached by, desired charging rate cost thresholds, etc.

The method 800 may also or alternatively comprise charging, in accordance with the charging schedule, the vehicle, at 808. One or more parking space charge devices may, for example, couple to provide (and/or receive) electrical energy from the vehicle in accordance with the determined schedule and/or regimen.

Figure 9:
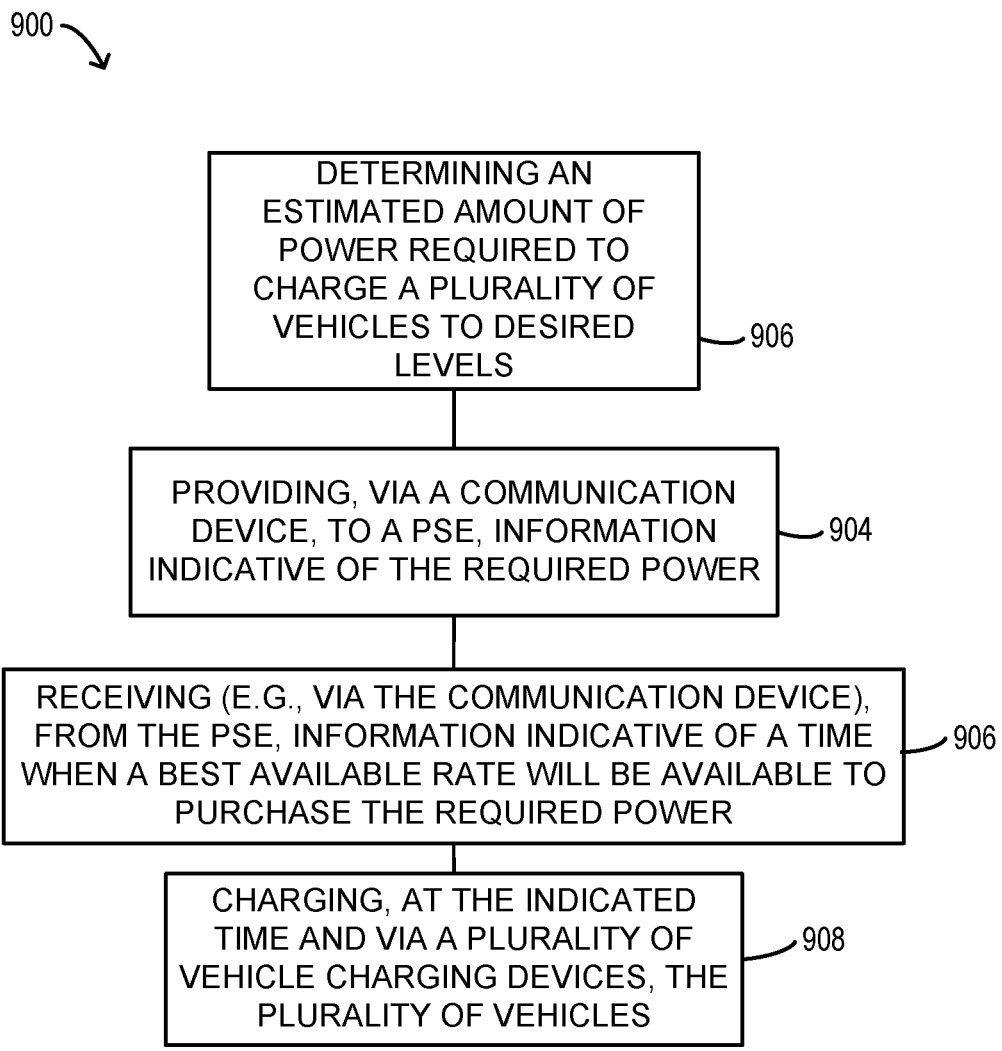
FIG. 9 is a flow diagram of a method according to some embodiments.

Referring to FIG. 9, a flow diagram of a method 900 according to some embodiments is shown. The method 900 may be performed, for example, by an ECS and/or one or more components thereof as described herein. In some embodiments, the method 900 may comprise determining an estimated amount of power required to charge a plurality of vehicles to desired levels, at 902. Utilizing information received and/or determined regarding the plurality of vehicles, for example, the ECS may compute an estimated amount of energy required to satisfy the desired charging regimens of the plurality of vehicles and/or an estimated amount of time required to achieve and/or implement such charging regimens.

The method 900 may also or alternatively comprise providing (e.g., via a communication device), to a PSE, information indicative of the required power, at 904. The requirements and/or estimates determined and/or calculated at 902, for example, may be provided to the PSE.

The method 900 may also or alternatively comprise receiving (e.g., via the communication device), from the PSE, information indicative of a time when a best available rate will be available to purchase the required power, at 906. The PSE may analyze the charging requirement information provided by the ECS and may provide a suggested schedule to the ECS. In some embodiments, the information provided by the PSE may simply comprise rate and/or usage information, and the ECS may utilize such information to formulate and/or derive appropriate charging schedules.

The method 900 may also or alternatively comprise charging, at the indicated time and via a plurality of vehicle charging devices, the plurality of vehicles, at 908. The charging at 908 may, in some embodiments, be similar to the charging conducted at 808 of the method 800 herein.

Figure 10:
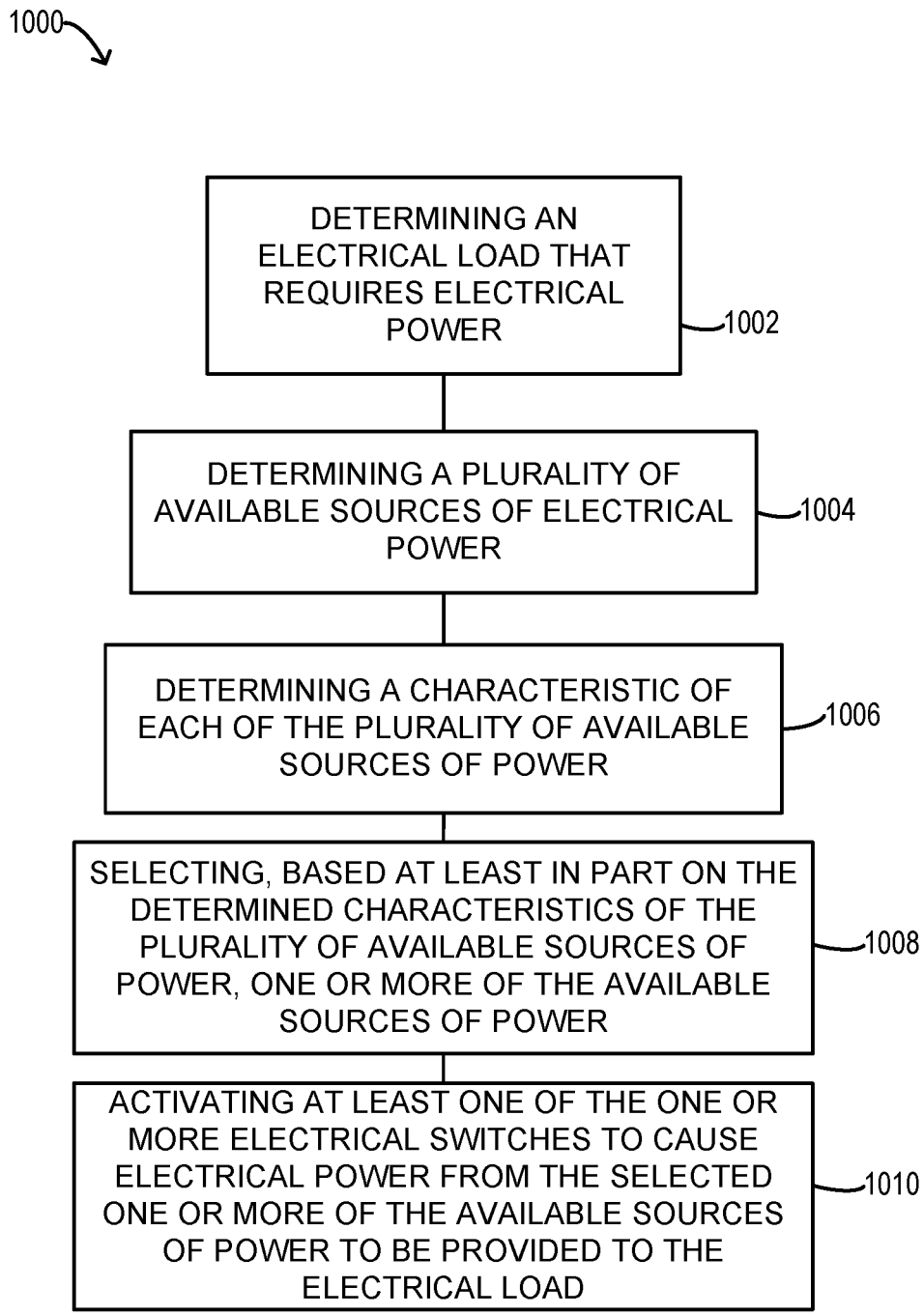
FIG. 10 is a flow diagram of a method according to some embodiments.

Referring to FIG. 10, a flow diagram of a method 1000 according to some embodiments is shown. In some embodiments, the method 1000 may comprise determining an electrical load that requires electrical power, at 1002. A processor may determine an electrical draw on a circuit, for example, and/or may communicate with an entity associated with a load (e.g., an ECS and/or an electric vehicle) to determine the requirements of the load.

The method 1000 may also or alternatively comprise determining a plurality of available sources of electrical power, at 1004. An ECS and/or "intelligent" electric switching device may, for example, be provided with a list of available power sources and/or may query to determine and/or discover available sources of power.

The method 1000 may also or alternatively comprise determining a characteristic of each of the plurality of available sources of power, at 1006. Various characteristics such as voltage, amperage, available quantity, consistency of generation, cost, generation type, and/or distance to the load (e.g., either "as-the-crow-flies" or along one or more specific electrical traces and/or transmission paths) may, for example, be looked-up and/or determined. In some embodiments, information transmitted with electrical energy may provide some or all of the characteristic information.

The method 1000 may also or alternatively comprise selecting, based at least in part on the determined characteristics of the plurality of available sources of power, one or more of the available sources of power, at 1008. One or more stored rules may govern, for example, how a preferred power source is selected. In some embodiments, preferred power sources may comprise power sources that are located closer to the electrical load than other power sources. Such power sources may be more desirable, for example, due to the smaller amount of losses (and accordingly, increased efficiency) associated with delivering power from such sources to the load.

In some embodiments, the "greenness" and/or relative environmental friendliness of energy produced by a specific power source may be determined as a characteristic. Preferred power sources may then, for example, comprise renewable energy sources (e.g., regardless of distance from the load), taking into account externalities that may otherwise not be taken into account when operating electrical switching equipment. In some embodiments, various characteristics may be scored and power sources may be assigned an overall point total. The power source listing may then be ranked, for example, and the highest ranking power source (or the highest ranking number of power sources; e.g., the top three (3)) may be selected as the preferred power source(s).

The method 1000 may also or alternatively comprise activating at least one of the one or more electrical switches to cause electrical power from the selected one or more of the available sources of power to be provided to the electrical load, at 1010.

VII. Other Details of Embodiments

A. Wireless Charging Nodes

A parking space or other expanse suitable for maintaining an automobile in a generally stationary fashion is equipped with a means for wirelessly charging an automobile. Various methods for wirelessly transmitting an electrical charge are known including, but not limited to, resonant inductive coupling, and wireless microwave transmission. In addition, a company referred to as Powercast™ has demonstrated power transmission for quite a distance using RF (Radio Frequency) technology to beam EM waves in a direction to a transceiver which then converts the EM waves back to electricity. While described with reference to various technologies for enabling the wireless transmission of electrical energy, the exemplary embodiments described are not limited to any particular mode or process of such wireless transmission. Rather, the invention is broadly drawn to encompass any and all technologies that facilitate or otherwise enable the provision of electricity, electrical energy, and/or electrical power from a source to a receiver without a physical connection (i.e., a wire or other physical electricity conducting medium) between the source and receiver. While many embodiments described herein are directed to wireless charging and/or energy transmission between vehicles and a power grid, some embodiments herein may be practiced utilizing plug-in and/or physical coupling to provide energy transmission. Load distribution, balancing, and/or pricing embodiments may, for example, be practiced in conjunction with any electrical transmission apparatus that is or becomes known or practicable (e.g., not limited to wireless charging and/or transmissions).

When an automobile is positioned within a distance suitable for the provision of wireless electrical power, the provision of electrical power is enabled. In one embodiment, electrical power is wirelessly transmitted from a transmitter positioned underground or flush with the surface of the ground or pavement. In another embodiment, a transmitter is configured around the periphery of a space such that it is in sufficient proximity to a parked or stationary automobile to enable the transmission of electrical power.

The presence of an automobile may be sensed, as by a pressure sensor or via short range electronic communication such as Bluetooth or the like. In the latter instance, data may be transmitted between the automobile and a transceiver associated with the electrical transmitter. Such data may include, for example, a unique automobile identifier (e.g., a Vehicle Identification Number (VIN)), an account identifier (e.g., a credit card account, bank account, EZ-Pass® Account, Pay-Pal® Account, and/or electrical supplier account), and user selected parameters defining user charging preferences.

For example, upon pulling up to a space enabled/operable to provide electricity in a wireless fashion from one or more transmitters embedded flush with the surface of the pavement, a sensor receives an interrogation signal sent via Bluetooth® from the automobile sent as function of the automobile being put into park (and/or put into neutral, the parking brake being engaged, the engine being shut off, and/or the key being turned to a specific position—e.g., position "IV" may comprise a position dedicated to indicating that the driver describes to activate one or more charging and/or power transmission sequences). The sensor receives an identifier of the automobile and interfaces with a central server to retrieve account information of an owner of the automobile. Likewise, such information can be stored in a memory device associated with the automobile and sent to the sensor. In addition, either sent from the automobile or retrieved from a server using the identifier, the sensor receives information regarding parameters defining how the automobile is to be charged. For example, such information might define a maximum rate willing to be paid for electricity. In addition, such information might specify a time by which the car is to be a certain percent charged. For example, a user may have specified that the car is not to be charged if the cost of electricity is over $.10/kWh. The user may also have specified that the automobile needs to be 80% charged at the end of eight hours. In some embodiments, the user may indicate a desired charging level (and/or a desired charging level may be automatically calculated) based on a desired distance of travel. In the case that the vehicle/charging facility is located 20 miles from the driver's home, for example, the driver (and/or the vehicle or charging station) may determine that the vehicle should be charged to have enough power to travel the 20 miles home (with or without a factor of safety and/or reserve travel capacity).

In the above example, the information may be entered into a central server for retrieval by the electrical charging system (ECS)(comprising the sensor and means for electrical charging), such as via a web page configuration page accessible by the driver or entered into the automobile such as via a dashboard based interface. Any other well known method incorporating a graphical user interface (GUI) may be employed to enter data into the automobile based memory or server. For example, an iPhone® interface may communicate via Bluetooth® with a memory device and processor resident in the automobile to make and/or change parameter selections. [Microsoft Sync . . . ]

Once the information is received, the ECS operates to determine an appropriate charging schedule. For example, a driver parks his car in a space having an ECS. The driver knows that his car will sit in the space all work day, hence the chosen charging duration of eight hours. The ECS, perhaps relying on other retrieved information specifying the charging characteristics of the automobile, computes that it will take approximately three hours of charging to charge the automobile to a minimum of 80% charged. The ECS, via communication with the power supplier, determines that the present cost of electricity is $.12/kWh but will fall to $.09/kWh in two hours. The system therefore waits for two hours before charging the automobile for approximately three hours.

In addition to computing and implementing a charging regimen to meet the user specified parameters, the ECS can communicate with the user/driver to alert the driver to potential problems. For example, with reference to the example above, the ECS may determine that the cost of electricity will be below $.10/kWh for only two of the next eight hours. The ECS may send a message to this effect to the user via a user specified node, such as a message on a dashboard display device, a message sent to a cell phone, an email account or the like. The user may be enabled to reply so as to modify or override a predetermined parameter selection. For example, the user may relax the maximum price for electricity attribute. In addition, the predefined parameter selections may include directions for actions to be taken when the predetermined charging regime cannot be met.

When charging is enabled, the system stores and makes accessible information regarding the operation of the ECS. For example, the user/driver can access real time (or near real time) charging information via a web page interface. For example, the user may enter a userid and password to view charging/account information. The viewable information may be maintained by the entity supplying the electrical power and/or by the proprietor of the ECS (which may be the same entity). The user may see that, at present, the ECS has scheduled charging to begin in two hours and proceed for the next three hours at a rate of $.085/kWh at which time the automobile will be 80% charged. At such time, the user may change selected parameters, such as the degree of desired charging and request an updated charging profile. For example, the user may change the requested charge percentage to be 100%. In response, ECS recomputes a charging regimen for display to the user/driver.

In the above described manner, the driver predefines a charging profile that is read and acted upon the ECS without required further input from the user/driver. By employing a central server, the charging regimen can be maintained as the user/driver leaves one ECS and parks at another ECS.

B. Load Balancing

As noted briefly above, when computing a charging regimen to match the user defined charging parameters, the ECS may communicate with a system or systems operated by the power supplying entity (PSE). In this manner, load balancing can be affected. For example, by communicating with the power supplier, the ECS may be able to obtain/ "lock in" a desirable price for electricity at present or at a time in the future. For example, at peak times when electricity is most expensive, the PSE may inform the ECS that it will commit to providing three hours of electricity at $.085/kWh in two hours provided that it not provide any electricity for the next two hours. If thousands of cars are in communication with a PSE via an ECS and are somewhere within a charging regimen at any one time, such a shifting of the provision of electricity to a future time operates to balance the load at the PSE so as better obtain maximally efficient electricity generation.

Such load balancing may be implemented in real time. For example, if the PSE experiences an unexpected peak consumption requiring the inefficient firing up of additional electricity providing elements, the PSE can communicate with the ECSs to request a delay in providing electricity to automobiles. With reference to the above example, the ECS has determined that the automobile requires only three hours over the course of the next eight hours to charge the automobile to the requested level. As a result, the ECS can delay providing electricity to the automobile for up to five hours as load balancing requires.

In one embodiment, electric cars are power generating entities. For example, the top and sides of an automobile may be fitted with solar panels. A typical automobile so outfitted may comprise approximately 60 ft 2 of solar panels. In addition, solar panels can be extended to incorporate more surface area, for example, when the automobile is substantially stationary. When parked outside, as in an outdoor parking lot with individual spaces configured to contain ECSs, a modest sized parking lot full of automobiles fitted with solar panels can generate a relatively large amount of electricity.

When fitted with solar panels, the ECS can operate to receive electricity from an automobile. For example, a user/driver may store amongst the preselected charging attributes that he will sell electricity generated by his automobile at a minimum price of $.11/kWh or at any price when the automobile does not need to be charged. For example, to shed some load, a PSE, currently charging $.14/kWh requests the ECSs to delay the charging of five hundred cars. The ECSs reply that five hundred cars can be delayed and, in addition, two hundred cars (perhaps some of which are included in the five hundred) have the capacity to sell electricity at various prices because they are either already charged or have specified a preference to sell electricity when possible (for the sake of simplicity, in the present example, they all agree to sell at $.11/kWh). The PSE instructs the ECSs to receive electricity from the two hundred automobiles while crediting the accounts of the users/ drivers providing electricity.

In another embodiment, the automobiles using the ECS are not electric cars but have likewise been fitted with solar panels and equipments required to transmit electricity to an ECS. One problem with encouraging the widespread use of solar panels, such as on the roofs of existing houses, is the large cost of installation and maintenance. By installing solar panels at an automobile factory, economies of scale are introduced. In addition, the surfaces of an automobile are readily accessible for maintenance purposes. In addition, most automobiles spend extended periods of time exposed to sunlight during the daylight hours. If exposed while connected to an ECS, such automobiles provide a large, at present untapped, source of electricity. Furthermore, if such automobiles are provided with a battery to store power when away from an ECS, the stored power can be transferred to a PSE via an ECS when possible.

C. Energy Costs

Electrical energy costs are typically comprised of two components: (i) an electrical energy generation charge, and (ii) an electrical energy transmission charge. While electrical energy generation charges vary depending upon the supplier of electrical energy (e.g., customers choosing to be supplied solely by renewable sources may pay more than customers receiving a mix of electrical energy), transmission charges are generally fixed. In some embodiments, electrical energy transmission costs may vary depending upon various factors such as a distance of an electrical load from one or more electrical sources. Electric vehicles provided with electrical charging energy from an ECS, for example, may be charged one transmission rate for electrical energy that comes from the PSE (e.g., "the grid"), while they may be charged a second (and likely lower) transmission rate for electrical energy supplied by other vehicles coupled to the ECS (e.g., since there is a very short transmission distance and/or very small transmission losses). Similarly, an office building receiving energy from an ECS in an adjacent parking lot may pay little or no transmission costs while it may pay standard transmission costs when purchasing power from the grid/PSE.

In some embodiments, the actual distance between loads and sources may be utilized to calculate an appropriate transmission charge and/or to look-up an appropriate transmission charge in a pre-stored table and/or other data store. According to some embodiments, other factors such as total expected transmission losses, installation and/or maintenance costs of utilized transmission components, etc., may be utilized to determine an appropriate transmission rate or cost. While a load may pull energy from a nearby source, for example, a transmission means such as an undersea cable or microwave transmission tower may comprise relatively expensive infrastructure that causes the transmission rate to be higher than if the source pulled power from a further source from which power could be delivered via a much less expensive means (e.g., a standard utility pole and power line configuration). In some embodiments, the cheapest available electrical transmission rate may be determined and/or the associated source(s) may be selected as the most appropriate source from which power should be supplied. According to some embodiments, the transmission route via which the smallest expected losses will occur may be determined and/or selected. In such a manner, for example, the power grid may be most efficiently managed to reduce transmission losses and maximize availability and usage of available power.

In some embodiments, the 'quality' of available electricity/energy from various sources may be compared and/or analyzed to determine from which available power source the power should be supplied. Some power sources and/or transmission means may provide power that is more consistent (e.g., with respect to supplied frequency, voltage, and/or amperage) than power/energy provided from other sources. For critical loads such as power supply to hospitals, for example, the closest power source may comprise an ECS from an adjacent parking lot/parking garage, but that source may provide intermittent and/or otherwise lower-quality energy than, say, a large hydropower facility several miles (or more) away, that is estimated to be capable of consistently providing steady and/or high quality power for longer periods of time (e.g., at night and/or during inclement weather). According to some embodiments, the 'quality' may also or alternatively be determined based on various externalities such as perceived environmental benefits and/or "greenness" of available power and/or power choices perceived to benefit the locality/local economy (e.g., coal power may be preferred and/or selected for a source in a small town in western Pennsylvania, even though other sources may be cheaper, higher quality, closer, and/or "greener", because the local and/or state or regional economy may be determined to be best served by purchasing relatively "local" products).

In some instances, electricity generated by solar panels attached to one or more automobiles in communication with one or more ECS may provide enough electricity to fully charge all of the automobiles in communication with the ECS. For example, the parking lot of a single office building may install an ECS that enables charging at a plurality of parking spaces. The automobiles utilizing the ECS may provide enough electricity, via solar panels, to meet all of the charging needs of the automobiles and may then divert additional electricity to the building.

Various exemplary embodiments described above allow for a multi-tiered approach to utilizing an ECS wherein additional benefits are realized with each additional tier of functionality. Such benefits include, but are not limited to, the following:

First, enabling the charging of automobiles (EVS) and other vehicles in a variety of environments allows for the charging of vehicles in an efficient manner. For example, vehicles typically remain parked in a single place for long periods of time each day. The ECS and described methods for using the ECS permit a vehicle to recharge, generally, throughout the day at times most convenient to the owner/operator of the vehicle. In the instance that the charging is enabled via wireless charging, the additional effort required by the operator of the vehicle is negligible;

Second, when the ECS is capable of communicating with the automobile, data may be exchanged to control the charging process. User defined preferences, stored at the automobile, on a server, or at any location accessible by the ECS can direct the charging process. In addition to enabling charging according to user defined preferences, the ECS may enable access by the user, such as via a web page, to view the charging status of the automobile in real time. By accessing profile information indicative of the individual performance of the automobile (such as prior charging times, battery life, battery performance, etc.), the ECS can customize the charging process as desired;

Third, when the ECS is enabled to communicate with a power generating entity, load balancing is enabled. In the scenario where millions of automobiles utilize an ECS, thus substantially shifting energy consumption from petroleum based products in the form of gasoline, diesel fuel and the like to nuclear or coal generated electricity, exemplary embodiments enable load balancing to, for example, permit the efficient operation of such electricity generating facilities; and Fourth, when automobiles incorporate solar panels, electricity can be generated and added to the grid, or otherwise utilized to power entities in communication with the ECS, via the ECS.

VIII. Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as $480i$, $480p$, $720p$, $1080i$, $1080p$ or the like. The format of information sent to the display may be any appropriate format such as Standard Definition TeleVision (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave as described hereinafter, or any other medium from which a computer can read. The terms "computer-readable memory" and/or "tangible media" specifically exclude signals, waves, and wave forms or other intangible media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, SAS™ by IGT, OASIS™ by Aristocrat Technologies, SDS by Bally Gaming and Systems, ATP, TCP/IP, GDS published by the Gaming Standards Association of Fremont CA, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

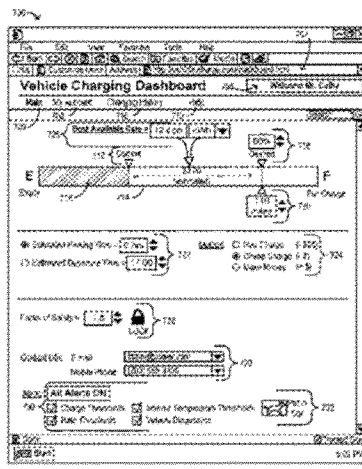

What is claimed is:

1. An electrical charging system, comprising:
a vehicle sensor;
a communication device;
a processor in communication with the vehicle sensor and the communication device; and
a memory in communication with the processor, the memory storing instructions that when executed by the processor cause the processor to:
receive, from the vehicle sensor, information indicative of a presence of an electric vehicle in a parking space;
receive, from the communication device, information indicative of one or more charging preferences corresponding to a desired charging of the electric vehicle, wherein the one or more charging preferences are defined by an operator of the electric vehicle;
determine, based at least on the one or more charging preferences and at least one current value of a dynamic attribute of an electric charge provider, a charging schedule for the electric vehicle;
wherein at least one of the one or more charging preferences is defined by user input received via a graphical user interface and adapted to display a vehicle charge indicator element comprising a first portion indicative of an amount of charge residing in a battery of the electric vehicle and a second portion indicative of an uncharged capacity of the battery of the electric vehicle and wherein the vehicle charge indicator element further comprises a slider by which an amount of charge may be specified;
charge, in accordance with the charging schedule, the electric vehicle;
receive a selection of a mode of operation of the electric vehicle that is defined by a stored temperature at which a temperature control system of the electric vehicle is to be set to maintain the interior temperature of the electric vehicle while the electric vehicle remains in a parked state;
display via the graphical user interface an indication of a status of the selected mode of operation of the electric vehicle, wherein the selected mode of operation comprises maintaining the interior temperature of the electric vehicle suitable for a pet located within the electric vehicle;
operate the temperature control system of the electric vehicle in accordance with the selected mode of operation for a duration of time;
determine that an amount of charge residing in a battery of the electric vehicle has reached a predefined threshold; and
send an alert to an operator of the electric vehicle indicative of the charge residing in the battery having reached the predefined threshold.

2. The electrical charging system of claim 1, wherein the graphical user interface is adapted to display a web page.

3. The electrical charging system of claim 2, wherein the graphical user interface forms a part of the electric vehicle.

4. The electrical charging system of claim 1, wherein the graphical user interface is adapted to receive a maintenance notification.

5. The electrical charging system of claim 4, wherein the graphical user interface forms a part of a smartphone.

6. The electrical charging system of claim 1, wherein the charging schedule for the electric vehicle is further based upon a factor of safety parameter and wherein the charging comprises transmitting a control signal to a parking space charge device that starts the charging.

7. The electrical charging system of claim 6, wherein the one or more charging preferences comprise the factor of safety parameter.

8. The electrical charging system of claim 1, wherein the alert is sent to a smartphone.

9. The electrical charging system of claim 1, wherein the charging of the electric vehicle is conducted via a wireless charging device.

10. An electrical charging method, comprising:
receiving, from a vehicle sensor, information indicative of a presence of an electric vehicle in a parking space;
receiving, via a communication device, information indicative of one or more charging preferences corresponding to a desired charging of the electric vehicle, wherein the one or more charging preferences are defined by an operator of the electric vehicle;
determining, by a processor, based at least on the one or more charging preferences and at least one current value of a dynamic attribute of an electric charge provider, a charging schedule for the electric vehicle;
charging, by the processor and in accordance with the charging schedule, the electric vehicle;
wherein at least one of the one or more charging preferences is defined by user input received via a graphical user interface and adapted to display a vehicle charge indicator element comprising a first portion indicative of an amount of charge residing in a battery of the electric vehicle and a second portion indicative of an uncharged capacity of the battery of the electric vehicle and wherein the vehicle charge indicator element further comprises a slider by which an amount of charge may be specified;

receiving, via the graphical user interface, a selection of a mode of operation of the electric vehicle that is defined by a stored temperature at which a temperature control system of the electric vehicle is to be set to maintain the interior temperature of the electric vehicle while the vehicle remains in a parked state;

displaying, via the graphical user interface, an indication of a status of the selected mode of operation of the electric vehicle, wherein the selected mode of operation comprises maintaining the interior temperature of the electric vehicle suitable for a pet located within the electric vehicle;

operating, by the processor, the temperature control system of the electric vehicle in accordance with the selected mode of operation for a duration of time;

determining, by the processor, that an amount of charge residing in a battery of the electric vehicle has reached a predefined threshold; and sending, via the communication device, an alert to an operator of the electric vehicle indicative of the charge residing in the battery having reached the predefined threshold.

11. The electrical charging method of claim 10, wherein the graphical user interface is adapted to display a web page.

12. The electrical charging method of claim 11, wherein the graphical user interface forms a part of the electric vehicle.

13. The electrical charging method of claim 10, wherein the graphical user interface is adapted to receive a maintenance notification.

14. The electrical charging method of claim 13, wherein the graphical user interface forms a part of a smartphone.

15. The electrical charging method of claim 10, wherein the charging scheduled for the electric vehicle is further based upon a factor of safety parameter and wherein the charging comprises transmitting a control signal to a parking space charge device that starts the charging.

16. The electrical charging method of claim 15, wherein the one or more charging preferences comprise the factor of safety parameter.

17. The electrical charging method of claim 10, wherein the alert is sent to a smartphone.

18. The electrical charging method of claim 10, wherein the charging of the electric vehicle is conducted via a wireless charging device.

19. An electrical charging system, comprising:
a vehicle sensor;
a communication device;
a processors in communication with the vehicle sensor and the communication device; and
a memory in communication with the processor, the memory storing instructions that when executed by the processor cause the processor to:
a memory in communication with the processor, the memory storing instructions that when executed by the processor cause the processor to:
 (a) receive, from the vehicle sensor, information indicative of a presence of a vehicle in a parking space;
 (b) receive, from the communication device, information indicative of one or more charging preferences corresponding to a desired charging of the vehicle, wherein the one or more charging preferences are defined by an operator of the vehicle;
 (c) determine a first value of a dynamic attribute of an electric charge provider;
 (d) determine, based at least on the one or more charging preferences and the first value of the dynamic attribute, a charging schedule for the vehicle;
 (e) charge the vehicle in accordance with the charging schedule;
 (f) retrieve a second value of the at least one dynamic attribute; and
 (g) repeat (d) and (e), utilizing the retrieved second value of the dynamic attribute as the first value of the dynamic attribute, wherein at least one of the one or more charging preferences is defined by user input received via a graphical user interface and adapted to display a vehicle charge indicator element comprising a first portion indicative of an amount of charge residing in a battery of the electric vehicle and a second portion indicative of an uncharged capacity of the battery of the electric vehicle and wherein the vehicle charge indicator element further comprises a slider by which an amount of charge may be specified;
 (h) receive a selection of a mode of operation of the vehicle that is defined by a stored temperature at which a temperature control system of the vehicle is to be set to maintain the interior temperature of the vehicle while the vehicle remains in a parked state;
 (i) display via the graphical user interface an indication of a status of the selected mode of operation of the vehicle, wherein the selected mode of operation comprises maintaining the interior temperature of the vehicle suitable for a pet located within the vehicle;
 (j) operate the temperature control system of the vehicle in accordance with the selected mode of operation for a duration of time;
 (k) determine that an amount of charge residing in a battery of the vehicle has reached a predefined threshold; and
 (l) send an alert to an operator of the electric vehicle indicative of the charge residing in the battery having reached the predefined threshold.

20. The electrical charging system of claim 19, wherein the graphical user interface is adapted to display a web page.

21. The electrical charging system of claim 20, wherein the graphical user interface forms a part of the vehicle.

22. The electrical charging system of claim 19, wherein the graphical user interface is adapted to receive a maintenance notification.

23. The electrical charging system of claim 22, wherein the graphical user interface forms a part of a smartphone.

24. The electrical charging system of claim 19, wherein the charging schedule for the vehicle is further based upon a factor of safety parameter and wherein the charging comprises transmitting a control signal to a parking space charge device that starts the charging.

25. The electrical charging system of claim 24, wherein the one or more charging preferences comprise the factor of safety parameter.

26. The electrical charging system of claim 19, wherein the alert is sent to a smartphone.

27. The electrical charging system of claim 19, wherein the charging of the vehicle is conducted via a wireless charging device.

28. An electrical charging system, comprising:
a communication device;
a processor in communication with the communication device; and a memory in communication with the processor, the memory storing instructions that when executed by the processor cause the processor to:

receive, from the communication device, information indicative of at least two charging preferences comprising a time by which an electric vehicle is to be charged to a predetermined amount and an indication that charging of the electric vehicle be based, at least in part, on a cost of providing electrical charge to the electric vehicle, wherein the at least two charging preferences are defined by an operator of the electric vehicle, and wherein at least the predetermined amount of charge is defined by user input received via a graphical user interface and adapted to display a vehicle charge indicator element comprising a first portion indicative of an amount of charge residing in a battery of the electric vehicle and a second portion indicative of an uncharged capacity of the battery of the electric vehicle and wherein the vehicle charge indicator element further comprises a slider by which the predetermined amount of charge may be specified;

determine, based at least on the at least two charging preferences, that the electric vehicle cannot be charged in accordance with the at least two charging preferences;

issue an alert that charging the electric vehicle in accordance with the at least two charging preferences is not possible;

receive an updated value for at least one of the at least two charging preferences in response to the issuance of the alert;

determine, based at least on the updated value for the at least one of the at least two charging preferences, that the electric vehicle can now be charged in accordance with the at least two charging preferences; and charge the electric vehicle in accordance with the at least two charging preferences.

29. The electrical charging system of claim 28, wherein the charging of the electric vehicle in accordance with the at least two charging preferences is conducted utilizing a wireless charging device.

* * * * *

UNITED STATES PATENT AND TRADEMARK OFFICE
CERTIFICATE OF CORRECTION

| | |
|---|---|
| PATENT NO. | : 11,575,275 B2 |
| APPLICATION NO. | : 17/829408 |
| DATED | : February 7, 2023 |
| INVENTOR(S) | : Jeffrey R. Ambroziak and Carson C. K. Fincham |

It is certified that error appears in the above-identified patent and that said Letters Patent is hereby corrected as shown below:

On the Title Page

The Title page, should be deleted and substitute therefor with the attached Title page.

In the Claims

Please replace Claims 1-29 with the following replacement Claims 1-30:

1. An electrical charging system, comprising:
a vehicle sensor;
a communication device;
a processor in communication with the vehicle sensor and the communication device; and
a memory in communication with the processor, the memory storing instructions that when executed by the processor cause the processor to:
receive, from the vehicle sensor, information indicative of a presence of a vehicle in a parking space;
receive, from the communication device, information indicative of one or more charging preferences corresponding to a desired charging of the vehicle, wherein the one or more charging preferences are defined by an operator of the vehicle;
determine, based at least on the one or more charging preferences and at least one current value of a dynamic attribute of an electric charge provider, a charging schedule for the vehicle; and
transmit a control signal to a parking space charge device that starts a charging, in accordance with the charging schedule, of the vehicle;
wherein at least one of the one or more charging preferences is defined by user input received via a graphical user interface and adapted to display a vehicle charge indicator element comprising a first portion indicative of an amount of charge residing in a battery of the electric vehicle and a second portion indicative of an uncharged capacity of the battery of the electric vehicle and wherein the vehicle charge indicator element further comprises a slider by which an amount of charge may be specified.

Signed and Sealed this
Sixth Day of May, 2025

Coke Morgan Stewart
*Acting Director of the United States Patent and Trademark Office*

2. The electrical charging system of claim 1, wherein the graphical user interface is adapted to display a web page.

3. The electrical charging system of claim 2, wherein the graphical user interface forms a part of the vehicle.

4. The electrical charging system of claim 1, wherein the graphical user interface is adapted to receive a maintenance notification.

5. The electrical charging system of claim 4, wherein the graphical user interface forms a part of a smartphone.

6. The electrical charging system of claim 1, wherein the determining of the charging schedule for the vehicle is further based upon a factor of safety parameter.

7. The electrical charging system of claim 6, wherein the one or more charging preferences comprise the factor of safety parameter.

8. An electrical charging method, comprising:
receiving, from a vehicle sensor, information indicative of a presence of an electric vehicle in a parking space;
receiving, via a communication device, information indicative of one or more charging preferences corresponding to a desired charging of the electric vehicle, wherein the one or more charging preferences are defined by an operator of the electric vehicle;
determining, by a processor, based at least on the one or more charging preferences and at least one current value of a dynamic attribute of an electric charge provider, a charging schedule for the electric vehicle; and
transmitting, by the processor, a control signal to a parking space charge device that starts a charging, in accordance with the charging schedule, of the electric vehicle;
wherein at least one of the one or more charging preferences is defined by user input received via a graphical user interface and adapted to display a vehicle charge indicator element comprising a first portion indicative of an amount of charge residing in a battery of the electric vehicle and a second portion indicative of an uncharged capacity of the battery of the electric vehicle and wherein the vehicle charge indicator element further comprises a slider by which an amount of charge may be specified.

9. The electrical charging method of claim 8, wherein the graphical user interface is adapted to display a web page.

10. The electrical charging method of claim 9, wherein the graphical user interface forms a part of the electric vehicle.

11. The electrical charging method of claim 8, wherein the graphical user interface is adapted to receive a maintenance notification.

12. The electrical charging method of claim 11, wherein the graphical user interface forms a part of a smartphone.

13. The electrical charging method of claim 8, wherein the determining of the charging schedule for the electric vehicle is further based upon a factor of safety parameter.

14. The electrical charging method of claim 13, wherein the one or more charging preferences comprise the factor of safety parameter.

15. An electrical charging system, comprising:
a vehicle sensor;
a communication device;
a processor in communication with the vehicle sensor and the communication device; and
a memory in communication with the processor, the memory storing instructions that when executed by the processor cause the processor to:
(a) receive, from the vehicle sensor, information indicative of a presence of a vehicle in a parking space;
(b) receive, from the communication device, information indicative of one or more charging preferences corresponding to a desired charging of the vehicle, wherein the one or more charging preferences are defined by an operator of the vehicle;
(c) determine a first value of a dynamic attribute of an electric charge provider;
(d) determine, based at least on the one or more charging preferences and the first value of the dynamic attribute, a charging schedule for the vehicle;
(e) transmit a control signal to a parking space charge device that starts a charging of the vehicle in accordance with the charging schedule;
(f) retrieve a second value of the at least one dynamic attribute; and
(g) repeat (d) and (e), utilizing the retrieved second value of the dynamic attribute as the first value of the dynamic attribute;
wherein at least one of the one or more charging preferences is defined by user input received via a graphical user interface and adapted to display a vehicle charge indicator element comprising a first portion indicative of an amount of charge residing in a battery of the electric vehicle and a second portion indicative of an uncharged capacity of the battery of the electric vehicle and wherein the vehicle charge indicator element further comprises a slider by which an amount of charge may be specified.

16. The electrical charging system of claim 15, wherein the graphical user interface is adapted to display a web page.

17. The electrical charging system of claim 16, wherein the graphical user interface forms a part of the vehicle.

18. The electrical charging system of claim 15, wherein the graphical user interface is adapted to receive a maintenance notification.

19. The electrical charging system of claim 18, wherein the graphical user interface forms a part of a smartphone.

20. The electrical charging system of claim 15, wherein the charging schedule for the vehicle is further based upon a factor of safety parameter.

21. The electrical charging system of claim 20, wherein the one or more charging preferences comprise the factor of safety parameter.

22. An electrical charging system, comprising:
a communication device;
a processor in communication with the communication device; and
a memory in communication with the processor, the memory storing instructions that when executed by the processor cause the processor to:
provide a user interface comprising: (i) a graphical depiction of an electric vehicle battery capacity, (ii) a graphical depiction of a current charge level of the electric vehicle battery, and (iii) a graphical input element that permits an operator of the vehicle to provide input defining a desired charge parameter of the electric vehicle; receive, from the communication device and via the user interface, information indicative of one or more charging preferences corresponding to a desired charging of the electric vehicle, wherein the one or more charging preferences are defined by the operator of the vehicle and include an indication of the desired charge parameter of the electric vehicle received via the graphical input element that permits the operator of the vehicle to provide input defining the desired charge parameter of the electric vehicle;
determine, based at least on the one or more charging preferences and at least one current value of a dynamic attribute of an electric charge provider, a charging schedule for the vehicle; and
transmit a control signal to a parking space charge device that starts a charging, in accordance with the charging schedule, of the electric vehicle.

23. The electrical charging system of claim 22, wherein the desired charge parameter comprises a desired charge limit for the electric vehicle.

24. The electrical charging system of claim 22, wherein the desired charge parameter comprises a time parameter governing charging of the electric vehicle.

25. The electrical charging system of claim 22, wherein the user interface is adapted to display a web page.

26. The electrical charging system of claim 25, wherein the user interface forms a part of the electric vehicle.

27. The electrical charging system of claim 22, wherein the user interface is adapted to receive a maintenance notification.

28. The electrical charging system of claim 27, wherein the user interface forms a part of a smartphone.

29. The electrical charging system of claim 22, wherein the charging schedule for the electric vehicle is further based upon a factor of safety parameter.

30. The electrical charging system of claim 29, wherein the one or more charging preferences comprise the factor of safety parameter.

(12) United States Patent
Ambroziak et al.

(10) Patent No.: US 11,575,275 B1
(45) Date of Patent: Feb. 7, 2023

(54) SYSTEMS AND METHODS FOR ELECTRIC VEHICLE CHARGING AND POWER MANAGEMENT

(71) Applicant: Charge Fusion Technologies, LLC, Ridgefield, CT (US)

(72) Inventors: Jeffrey R. Ambroziak, Guilford, CT (US); Carson C. K. Fincham, Ridgefield, CT (US)

(73) Assignee: Charge Fusion Technologies, LLC, Ridgefield, CT (US)

( * ) Notice: Subject to any disclaimer, the term of this patent is extended or adjusted under 35 U.S.C. 154(b) by 0 days.

(21) Appl. No.: 17/829,408

(22) Filed: Jun. 1, 2022

Related U.S. Application Data

(63) Continuation of application No. 17/306,776, filed on May 3, 2021, which is a continuation of application (Continued)

(51) Int. Cl.
*H02J 7/14* (2006.01)
*B60L 3/12* (2006.01)
(Continued)

(52) U.S. Cl.
CPC ............ *H02J 7/1446* (2013.01); *B60L 3/12* (2013.01); *B60L 8/003* (2013.01); *B60L 53/126* (2019.02); *B60L 53/14* (2019.02); *B60L 53/305* (2019.02); *B60L 53/64* (2019.02); *B60L 53/65* (2019.02); *B60L 53/665* (2019.02); *B60L 55/00* (2019.02); *G06Q 30/0283* (2013.01); *G06Q 30/04* (2013.01); *G06Q 50/06* (2013.01); *B60L 2200/26* (2013.01); *B60L 2210/40* (2013.01); *B60L 2240/72* (2013.01); *B60L 2240/80* (2013.01); *B60L 2250/10* (2013.01); *B60L 2250/16* (2013.01); *B60L 2260/52* (2013.01); *B60L 2260/54* (2013.01);
(Continued)

(58) Field of Classification Search
CPC ...... H02J 7/1446; B60L 55/00; B60L 53/126; B60L 53/64; B60L 53/14; B60L 53/305; B60L 53/665; B60L 53/65; B60L 3/12; B60L 8/003; G06Q 30/0283; G06Q 30/04; G06Q 50/06
USPC .................................................. 705/7.36
See application file for complete search history.

(56) References Cited

U.S. PATENT DOCUMENTS 4,347,472 A 8/1982 Lemelson
4,617,506 A 10/1986 Bogie
(Continued)

FOREIGN PATENT DOCUMENTS

JP H1055496 A 2/1998
JP 10170293 A 6/1998
(Continued)

OTHER PUBLICATIONS

Notice of Allowance dated Sep. 28, 2022 for U.S. Appl. No. 17/829,412 (pp. 1-17).
(Continued)

*Primary Examiner* — Igor N Borissov
(74) *Attorney, Agent, or Firm* — RowanTree Law Group PLLC; Carson C. K. Fincham

(57) ABSTRACT

Systems and methods for charging electric vehicles and for quantitative and qualitative load balancing of electrical demand are provided.

30 Claims, 10 Drawing Sheets